United States Patent
Kim et al.

(10) Patent No.: US 8,786,684 B2
(45) Date of Patent: Jul. 22, 2014

(54) METHOD OF DISPLAYING STEREOSCOPIC IMAGE AND STEREOSCOPIC IMAGE DISPLAY DEVICE FOR PERFORMING THE SAME

(75) Inventors: Hwi Kim, Seoul (KR); Oh-Jeong Kwon, Hwaseong-si (KR); Seung-Hoon Lee, Hwaseong-si (KR); Kyung-Ho Jung, Yongin-si (KR); Hee-Seop Kim, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1068 days.

(21) Appl. No.: 12/792,911

(22) Filed: Jun. 3, 2010

(65) Prior Publication Data
US 2011/0102560 A1     May 5, 2011

(30) Foreign Application Priority Data
Nov. 4, 2009 (KR) .............................. 2009-0105872

(51) Int. Cl.
*H04N 13/04* (2006.01)
*H04N 9/47* (2006.01)

(52) U.S. Cl.
USPC ............................................................ 348/56

(58) Field of Classification Search
None
See application file for complete search history.

(56) References Cited

U.S. PATENT DOCUMENTS

2008/0231690 A1 * 9/2008 Woodgate et al. ............. 348/51
2009/0244387 A1 * 10/2009 Lee et al. ..................... 348/674

* cited by examiner

*Primary Examiner* — Mehrdad Dastouri
*Assistant Examiner* — Kristin Dobbs
(74) *Attorney, Agent, or Firm* — F. Chau & Associates, LLC

(57) ABSTRACT

A stereoscopic image display device includes a display panel and an optical lens assembly. The display panel includes a plurality of pixels. The display panel temporally divides M view images corresponding to M viewing spaces to display the temporally divided image on a display panel. 'M' is a natural number of no less than two. The optical lens assembly converts the view image displayed on the display panel into N stereoscopic images in which directions of the view images are different from each other to emit the converted view image toward a viewing space corresponding to the view image displayed on the display panel. 'N' is a natural number no less than two.

17 Claims, 22 Drawing Sheets

METHOD OF DISPLAYING STEREOSCOPIC IMAGE AND STEREOSCOPIC IMAGE DISPLAY DEVICE FOR PERFORMING THE SAME

CROSS-REFERENCE TO RELATED APPLICATION

This application claims priority under 35 U.S.C. §119 to Korean Patent Application No. 2009-0105872, filed on Nov. 4, 2009, the disclosure of which is hereby incorporated by reference in it's entirety.

BACKGROUND OF THE INVENTION

1. Technical Field

Example embodiments of the present invention relate to a method of displaying stereoscopic image and a stereoscopic image display device for performing the method. More particularly, example embodiments of the present invention relate to a method of displaying stereoscopic image of a lenticular type capable of enhancing display quality and a stereoscopic image display device for performing the method.

2. Description of the Related Art

Generally, a display device displays a two-dimensional (2D) image. Recently, a stereoscopic image display apparatus displaying a three-dimensional (3D) stereoscopic image has been developed according to increasing demands for the 3D stereoscopic image in areas such as, for example video games, movies and so on. The stereoscopic image display apparatus may apply 2D flat images different from each other to one's eyes for displaying the 3D stereoscopic image. For example, one may watch a pair of 2D flat images through one's eyes and then the brain may synthesize the pair of 2D flat images for one to feel the stereoscopic image.

Generally, a stereoscopic image display device displays a three-dimensional (3D) image using a principle of binocular parallax through two eyes of human. For example, as two eyes of human are spaced apart from each other, images viewed at the different angles are inputted to the human brain. Thus, the observer may view a 3D image to recognize a stereoscopic image through the display device.

The stereoscopic image display device may be divided into a stereoscopic type and an auto-stereoscopic type with wearing an extra spectacle or not. The stereoscopic type may include an anaglyph type and a liquid crystal shutter stereoscopic type and so on. In the anaglyph type, blue glasses and red glasses may be required for a viewer to wear. In the liquid crystal shutter stereoscopic type, a left image and a right image may be temporally divided to be periodically displayed, and a viewer wears glasses which opens and closes a left eye liquid crystal shutter and a right eye liquid crystal shutter in synchronization with the displaying of the period of the left and right images.

The auto-stereoscopic may include a lenticular type in which a lenticular lens having a plurality of focusing points is used. In the lenticular type, the lenticular lens may refract a 2D image at the focusing points to emit a plurality of stereoscopic images. Thus, a viewer may view stereoscopic images through the lenticular lens.

SUMMARY OF THE INVENTION

Example embodiments of the present invention may provide a method of displaying stereoscopic image capable of enhancing viewing angle of a stereoscopic image.

Example embodiments of the present invention may also provide a stereoscopic image display device for performing the above-mentioned method.

According to one aspect of the present invention, there is provided a method of displaying a stereoscopic image. In the method, M view images corresponding to M viewing spaces are temporally divided to display the temporally divided image on a display panel. 'M' is a natural number of no less than two. The view image displayed on the display panel is converted into N stereoscopic images in which directions of the view images are different from each other to emit the converted view image toward a viewing space corresponding to the view image displayed on the display panel. 'N' is a natural number of no less than two.

According to another aspect of the present invention, a stereoscopic image display device includes a display panel and an optical lens assembly. The display panel includes a plurality of pixels. The display panel temporally divides M view images corresponding to M viewing spaces to display the temporally divided image on a display panel (wherein, 'M' is a natural number of no less than two). The optical lens assembly converts the view image displayed on the display panel into N stereoscopic images in which directions of the view images are different from each other to emit the converted view image toward a viewing space corresponding to the view image displayed on the display panel (wherein, 'N' is a natural number of no less than two).

According to a method of displaying stereoscopic image and a stereoscopic image display device for performing the method, stereoscopic images having N directional characteristics that are different from each other may be emitted toward M viewing spaces in a temporal division type, so that the number of viewpoint of N×M of stereoscopic images may be increased. Thus, the viewing angle of the stereoscopic image may be increased, so that display quality of the stereoscopic image may be enhanced.

BRIEF DESCRIPTION OF THE DRAWINGS

Example embodiments of the present invention can be understood in more detail from the following description taken in conjunction with the accompanying drawings, in which.

DETAILED DESCRIPTION OF THE EXAMPLE EMBODIMENTS OF THE INVENTION

Figure 1:
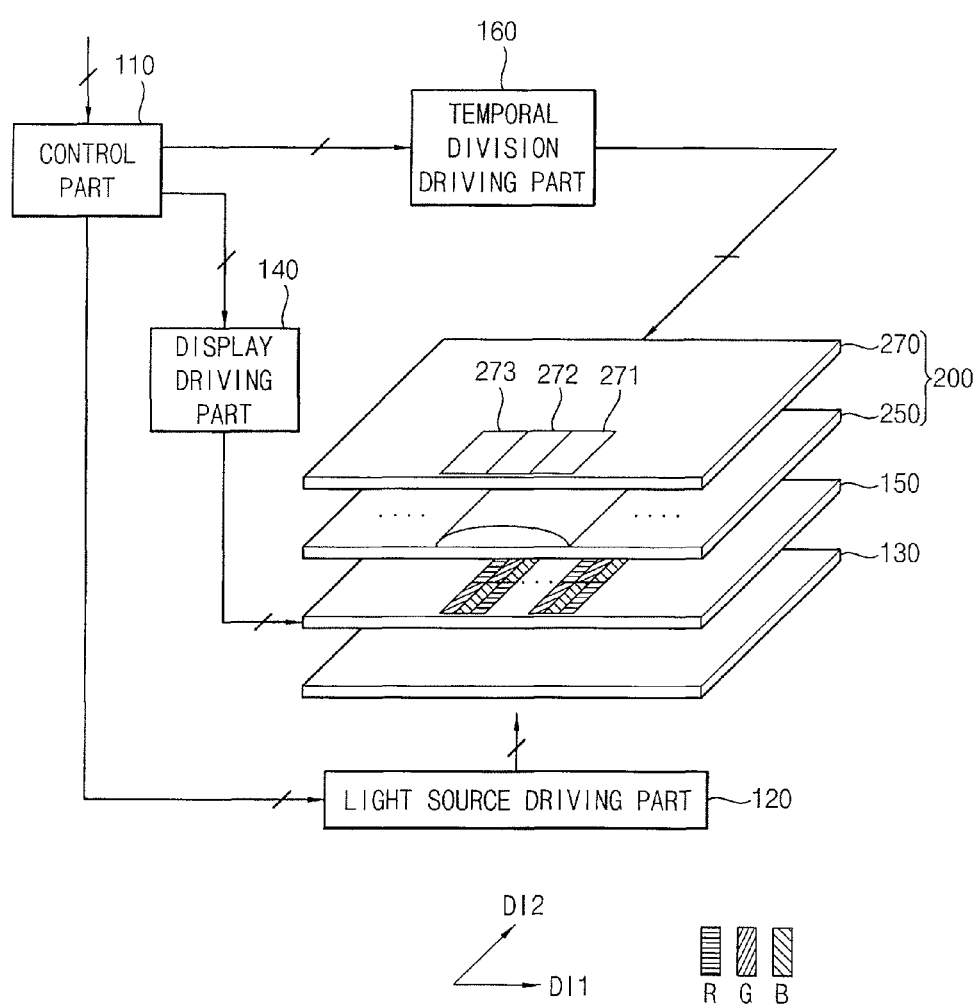
FIG. 1 is a block diagram illustrating a stereoscopic image display device according to an Example Embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Example Embodiment 1

FIG. 1 is a block diagram illustrating a stereoscopic image display device according to Example Embodiment 1 of the present invention.

Referring to FIG. 1, the stereoscopic image display device 110 includes a light source driving part 120, a light source part 130, a display division part 140, a display panel 150, an optical lens assembly 200 and a temporal division driving part 160.

The control part 110 controls the operation of the stereoscopic image display device 110. Hereinafter, when components of the stereoscopic image display device 110 are described, the control part 110 will be described.

The light source driving part 120 generates driving signals for driving the light source part 130 in accordance with the controlling of the control part 110.

The light source part 130 includes a plurality of light sources generating lights. The light source part 130 is disposed below the display panel 140 to provide the display panel 140 with lights. The light source may be, for example, a direct-illumination type or an edge-illumination type in accordance with a position of the light source. The light source may include, for example, a fluorescent lamp and a light-emitting diode.

The display driving part 140 drives the display panel 140 in accordance with a control of the control part 110. The display driving part 140 includes a gate driving part and a data driving part.

The control part 110 generates M view images corresponding to M viewing spaces based on an image received from an external device. The control part 110 provides the display driving part 110 with the M view images by dividing a frame interval period into M sub-frame interval periods. In this case, M is a natural number of no less than two.

For example, the control part 110 generates three view images, that is, a first view image corresponding to a first viewing space, a second view image corresponding to a second viewing space and a third view image corresponding to a third viewing space, based on an image received from an external device. The control part 110 divides the frame interval period into a first sub-frame interval period, a second sub-frame interval period and a third sub-frame interval period. The control part 110 provides the display driving part 140 with the first view image for the first sub-frame interval period, and provides the display driving part 140 with the second view image for the second sub-frame interval period. The control part 110 provides the display driving part 140 with the third view image for the third sub-frame interval period. When a frequency of the frame interval period is about 60 Hz, a frequency of the sub-frame may be about 180 Hz. When a frequency of the frame interval period is about 80 Hz, a frequency of the sub-frame may be about 240 Hz.

The display panel 150 includes, for example, a red pixel G, a green pixel G and a green pixel B that are disposed in a mosaic shape. Each of the pixels R, G and B has a short side extended along a first direction DI1 and a long side extended along a second direction DI2 crossing the first direction DI1. The display panel 150 displays the M view images in a temporal division type in accordance with the controlling of the display driving part 140. For example, the display panel 150 displays the first view image for the first sub-frame interval period, displays the second view image for the second sub-frame interval period, and displays the third view image for the third sub-frame interval period.

The optical assembly 200 includes a spatial division lenticular lens part 250 and a temporal dividing part 270. The optical assembly 200 converts the view image displayed on the display panel 150 into N stereoscopic images in which directions of the view images are different from each other and emits the converted view image toward a viewing space corresponding to the view image displayed on the display panel, wherein, 'N' is a natural number no less than two.

The spatial division lenticular lens part 250 converts a view image displayed on the display panel 150, which is of the M view images, into N stereoscopic images of which directions are different from each other. Then, the spatial division lenticular lens part 250 emits the N stereoscopic images to the M viewing spaces, respectively. In this case, N is a natural number of no less than two.

The temporal dividing part 270 includes M shutters respectively corresponding to the M viewing spaces. The temporal dividing part 270 emits the N stereoscopic images which are emitted toward a viewing space corresponding to the view image displayed on the display panel 150 and are of N×M stereoscopic images emitted toward M viewing spaces through the spatial division lenticular lens part 250, and blocks the N stereoscopic images emitted toward another viewing space different from the viewing space corresponding to the view image displayed on the display panel 150.

For example, the temporal dividing part 270 includes a first shutter 271 corresponding to the first viewing space, a second shutter 272 corresponding to the second viewing space and a third shutter 273 corresponding to the third viewing space.

The temporal division driving part 160 controls the opening and the closing of the M shutters in accordance with the controlling of the control part 110. For example, when the first view image corresponding to the first viewing space is displayed on the display panel 150, the temporal division driving part 160 controls the temporal division part 270 so that the first shutter 271 is opened and the second and third shutters 272 and 273 are closed. Moreover, when the second view image corresponding to the second viewing space is displayed on the display panel 150, the temporal division driving part 160 controls the temporal division part 270 so that the second shutter 272 is opened and the first and third shutters 271 and 273 are closed. Furthermore, when the third view image corresponding to the third viewing space is displayed on the display panel 150, the temporal division driving part 160 controls the temporal division part 270 so that the third shutter 273 is opened and the first and second shutters 271 and 272 are closed.

Thus, the viewer may view the N stereoscopic images emitted toward the first viewing space for the first sub-frame interval period, may view the N stereoscopic images emitted toward the second viewing space for the second sub-frame interval period, and may view the N stereoscopic images emitted toward the third viewing space for the third sub-frame interval period.

As a result, as the viewer may view M×N stereoscopic images during one frame, a viewing angle (or the number of viewpoint) of a stereoscopic image may be increased.

Hereinafter, there will be explained a case when 'M' is '3' and 'N' is '9.'

Figure 2:
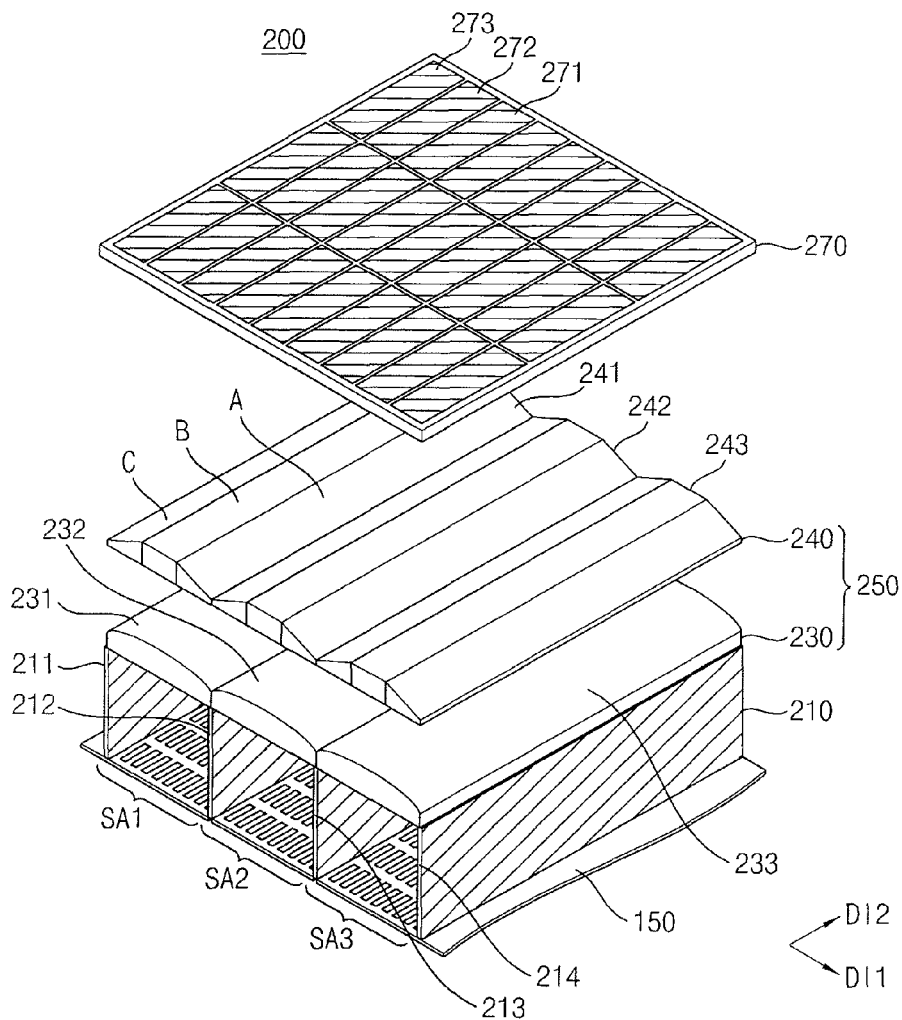
FIG. 2 is a perspective view of an optical lens assembly of FIG. 1.

FIG. 2 is a perspective view of an optical lens assembly of FIG. 1.

Referring to FIGS. 1 and 2, the optical lens assembly 200 includes a partition wall part 210, a spatial division lenticular lens part 250 and a temporal division part 270.

The partition wall part 210 is disposed in a vertical direction with respect to the display panel 150. The partition wall part 210 includes, for example, a first partition wall 211, a second partition wall 212, a third partition wall 213 and a fourth partition wall 214 that are disposed between predetermined N color pixels. The first to fourth partition wall parts 211, 212, 213 and 214 may divide the display panel 150 into, for example, a first sub-area SA1, a second sub-area SA2 and a third sub-area SA3. The partition walls 211 and 212 adjacent to each other may define one sub-area, for example, the first sub-area SA1. When a resolution of the display panel 150 is p×q (wherein 'p' and 'q' are natural numbers), the first sub-area SA1 may correspond to 9×q color pixels. The partition wall part 210 may include, for example, a nontransparent material which blocks lights.

The spatial division lenticular lens part 250 includes a lenticular plate 230 and a spatial division plate 240. The lenticular plate 230 includes, for example, a plurality of lenticular lenses 231, 232 and 233 corresponding to the first to third sub-area SA1, SA2 and SA3, respectively. For example, the lenticular lenses 231, 232 and 233 are arranged in the first direction DI1, and each of the lenticular lenses 231, 232 and 233 is extended in the second direction DI2. For example, the lenticular lens 231 refracts a 2D image displayed on the sub-area SA1 into stereoscopic images having nine directional characteristics.

The spatial division plate 240 is disposed on the lenticular plate 230 to include, for example, a plurality of spatial dividing lenses 241, 242 and 243. For example, the spatial dividing lenses 241, 242 and 243 are arranged in the first direction DI1, and each of the spatial dividing lenses 241, 242 and 243 is extended in the second direction DI2. For example, each of the spatial dividing lenses 241, 242 and 243 includes a first light-exiting portion A, a second light-exiting portion B and a third light-exiting portion C which are respectively corresponding to the three viewing spaces.

The spatial division lens 241 emits nine stereoscopic images that are emitted from the corresponding lenticular lens 231 toward a first viewing space, a second viewing space and a third viewing space. The first light-exiting portion A emits the nine stereoscopic images toward the first viewing space, the second light-exiting portion B emits the nine stereoscopic images toward the second viewing space, and the third light-exiting portion C emits the nine stereoscopic images toward the third viewing space.

The temporal division part 270 is disposed on the spatial division lenticular lens part 250 to include a first shutter 271, a second shutter 272 and a third shutter 273 that are disposed in accordance with the first, second and third light-exiting portions of the spatial division lens 241, respectively. For example, the first shutter 271 is disposed on a position corresponding to the first light-exiting portion A, the second shutter 272 is disposed on a position corresponding to the second light-exiting portion B, and the third shutter 273 is disposed on a position corresponding to the third light-exiting portion C. Each of the first, second and third shutters 271, 272 and 273 may control that the nine stereoscopic images are emitted toward the first, second and third viewing spaces.

Each of the first, second and third shutters 271, 272 and 273 is arranged in plural numbers along the second direction DI2 as shown in FIG. 2. Alternatively, each of the first, second and third shutters 271, 272 and 273 may be extended along the second direction DI2 in similar with the lenticular lens 241. As shown in FIG. 2, each of the first, second and third shutters 271, 272 and 273 may be disposed corresponding with 9×3 color pixels.

The first, second and third shutters 271, 272 and 273 may be opened and closed in response to an image displayed on the display panel 150. For example, when the first view image is displayed on the display panel 150, the first shutter 271 is opened and the second and third shutters 272 and 273 are closed so that nine stereoscopic images emitted through the first light-exiting portion A are emitted toward the first viewing space. Then, when the second view image is displayed on the display panel 150, the second shutter 272 is opened and the first and third shutters 271 and 273 are closed so that nine stereoscopic images emitted through the second light-exiting portion B are emitted toward the second viewing space. When the third view image is displayed on the display panel 150, the third shutter 273 is opened and the first and second shutters 271 and 272 are closed so that nine stereoscopic images emitted through the third light-exiting portion C are emitted toward the third viewing space.

As a result, as the nine stereoscopic images are emitted toward the first, second and third viewing spaces in a temporal division method, a viewer may view 3×9 stereoscopic images. Thus, the temporal division method is used, so that a viewing angle (or the number of viewpoint) of a stereoscopic image may be increased.

Figure 3:
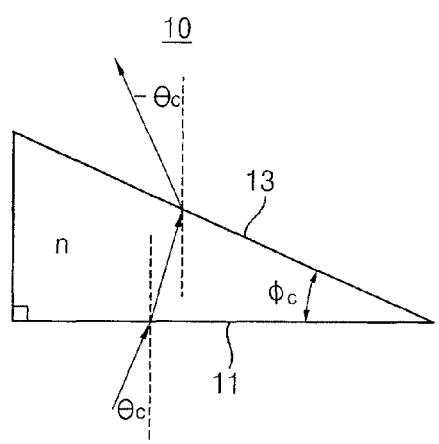
FIG. 3 is a conceptual diagram showing an optical principle of a spatial division lens of FIG. 2.

FIG. 3 is a conceptual diagram showing an optical principle of a spatial division lens of FIG. 2.

Referring to FIGS. 2 and 3, refractive index of a right-angled prism 10 is n. The right-angled prism 10 includes a light incident surface 11 on which light is incident and a light-exiting surface 13 on which light is exited. The light-exiting surface 13 is inclined by an inclined angle with respect to the light incident surface 11.

Light beams incident at a first angle θc with respect to the light incident surface 11 are firstly refracted at the light incident surface 11, and are secondly refracted at the light-exiting surface 13 through a body of the right-angled prism 10 to be exited at a second angle −θc.

The inclined angle $\phi c$ of the right-angled prism 10 may be defined by the following Equation 1 in accordance with Snell's Law.

$$\tan\phi c = \frac{2\sin\theta c}{\sqrt{n^2 - \sin^2\theta c} - \cos\theta c} \qquad \text{Equation 1}$$

Referring to Equation 1, when an inclined angle $\phi c$ of the right-angled prism is adjusted, it is possible that an exiting angle of light beams exiting through the light-exiting surface 13 is −θc when light beams having an incident angle of θc is incident into the light incident surface 11.

Based on Equation 1, in a case when a refractive index of the right-angled prism 10 is about 1.5, an incident angle $\phi c$ is about 19.1746 degrees and an incident angle θc of a light beam incident into the light incident surface 11 is about 5 degrees, an exiting angle of light beams exiting through the light-exiting surface 13 may be about −5 degrees. That is, when the incident angle $\phi c$ of the right-angled prism 10 is about 19.1746 degrees, an exiting light beam may be obtained, which has a slope identical to a slope of the incident light beam and an opposition direction opposite to that of the incident light beam.

Figure 4A:
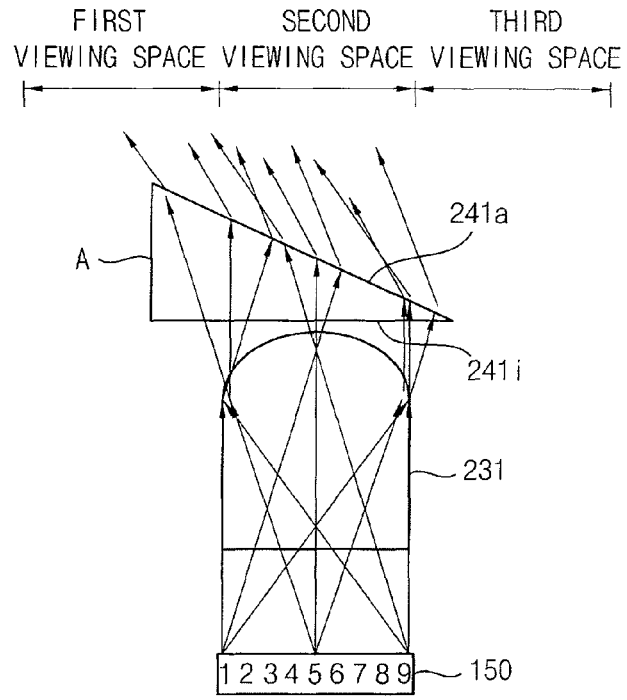
FIGS. 4A, 4B and 4C are conceptual diagrams showing an optical principle of a spatial division lens of FIG. 2.
Figure 4B:
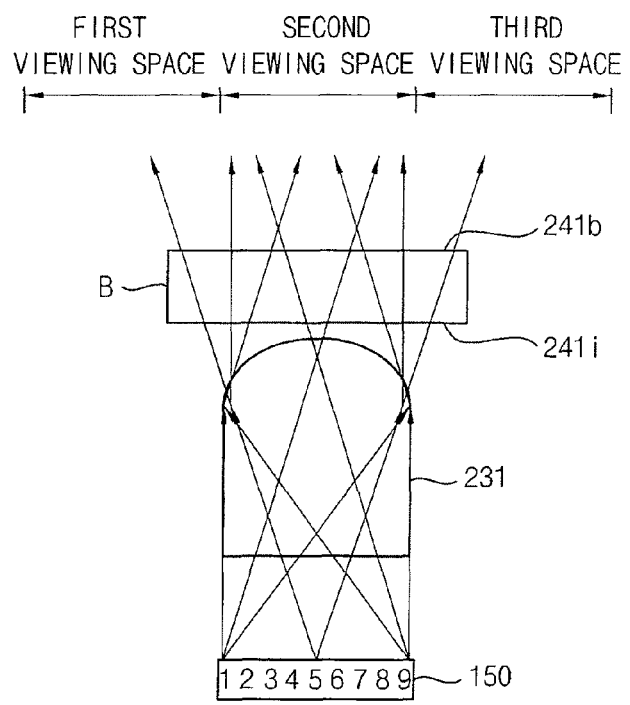
Figure 4C:
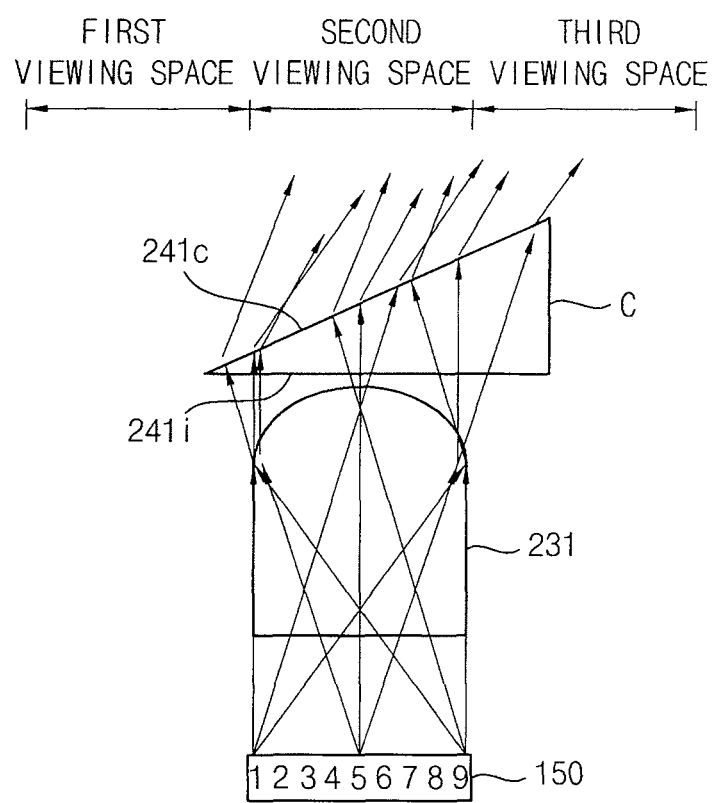

FIGS. 4A, 4B and 4C are conceptual diagrams showing an optical principle of a spatial division lens of FIG. 2.

Referring to FIGS. 3 and 4A, a first light-exiting portion A of the spatial division lens 241 includes a light incident surface 241i and a first light-exiting surface 241a which is inclined by a first inclined angle $\phi c$ with respect to the light incident surface 241i.

A 2D image is generated at nine color pixels of the display panel 150, that is, nine viewpoints 1, 2, 3, ..., 9. The 2D image generated at the nine viewpoints is emitted as nine stereoscopic images which have the different directional characteristics through the lenticular lens 231.

The nine stereoscopic images enter into the light incident surface 241i, and are refracted at the first light-exiting surface 241a which is inclined by the first inclined angle $\phi c$ to be emitted toward the first viewing space. Thus, the nine stereoscopic images are emitted toward the first viewing space, so that a viewer may view the nine stereoscopic images in the first viewing space.

Referring to FIGS. 3 and 4B, a second light-exiting portion B of the spatial division lens 241 includes the light incident surface 241i and a second light-exiting surface 241b which is in parallel with the light incident surface 241i. The 2D image generated at the nine viewpoints is emitted as nine stereoscopic images which have the different directional characteristics through the lenticular lens 231.

The nine stereoscopic images enter into the light incident surface 241i of the second light-exiting portion B. The nine stereoscopic images which enter into the second light-exiting portion B are penetrated through the second light-exiting surface 241b without refraction of light to be emitted toward a second viewing space. Thus, the nine stereoscopic images are emitted toward the second viewing space, so that a viewer may view the nine stereoscopic images in the first viewing space.

Referring to FIGS. 3 and 4C, a third light-exiting portion C of the spatial division lens 241 includes a light incident surface 241i and a third light-exiting surface 241c which is inclined by a second inclined angle $-\phi c$ with respect to the light incident surface 241i.

The 2D image generated at the nine viewpoints 1, 2, 3, ..., 9 is emitted as nine stereoscopic images which have the different directional characteristics through the lenticular lens 231.

The nine stereoscopic images enter into the light incident surface 241$i$, and are refracted at the third light-exiting surface 241$c$ which is inclined by the second inclined angle −$\phi$c to be emitted toward the third viewing space that is opposite to the first viewing space. Thus, the nine stereoscopic images are emitted toward the third viewing space, so that a viewer may view the nine stereoscopic images at the third viewing space.

Figure 5:
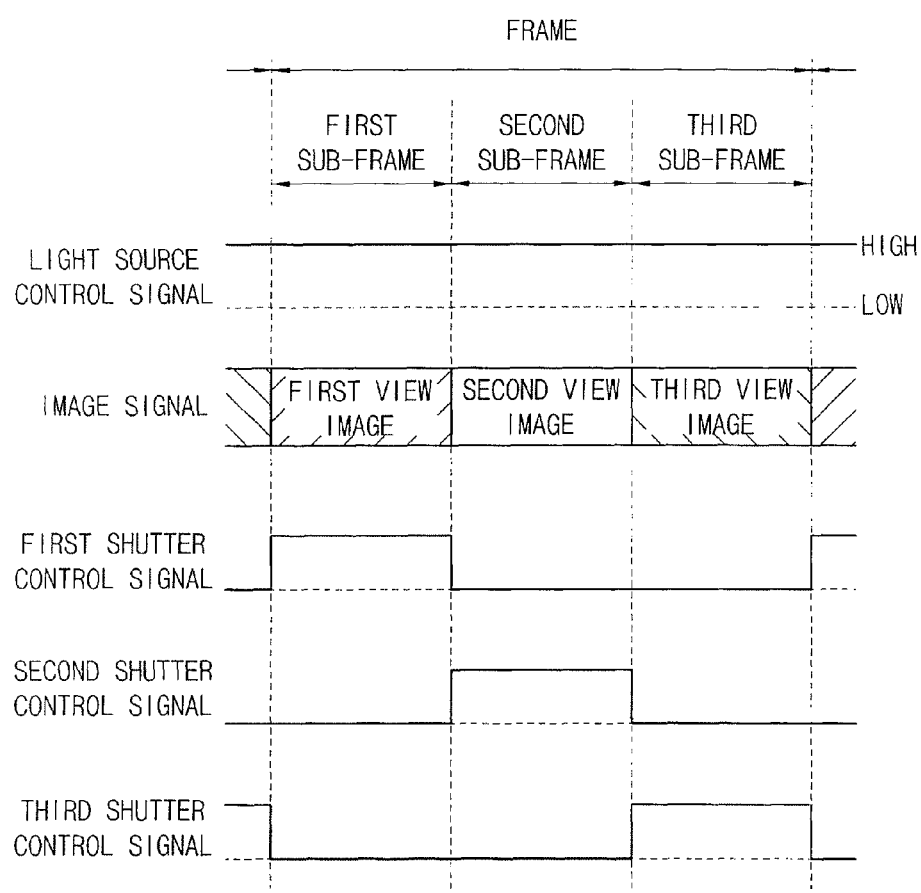
FIG. 5 is a timing diagram of the stereoscopic image display device of FIG. 1.

FIG. 5 is a timing diagram of the stereoscopic image display device of FIG. 1. FIGS. 6A to 6F are conceptual diagrams showing a method of displaying a stereoscopic image by the stereoscopic image display device of FIG. 1.

Figure 6A:
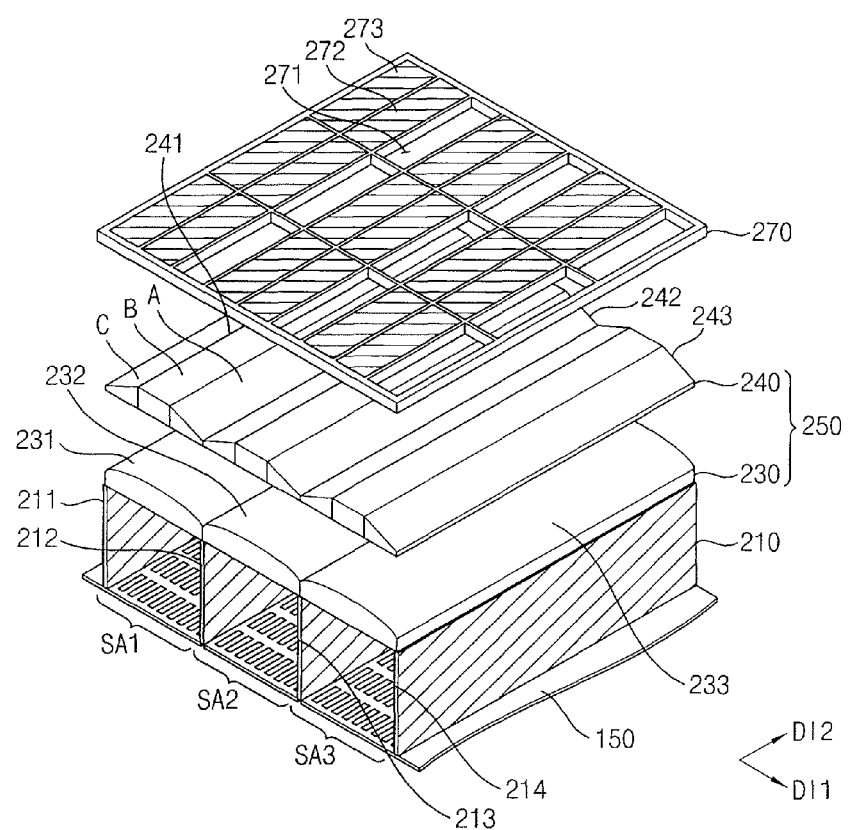
FIGS. 6A to 6F are conceptual diagrams showing a method of displaying a stereoscopic image by the stereoscopic image display device of FIG. 1.
Figure 6B:
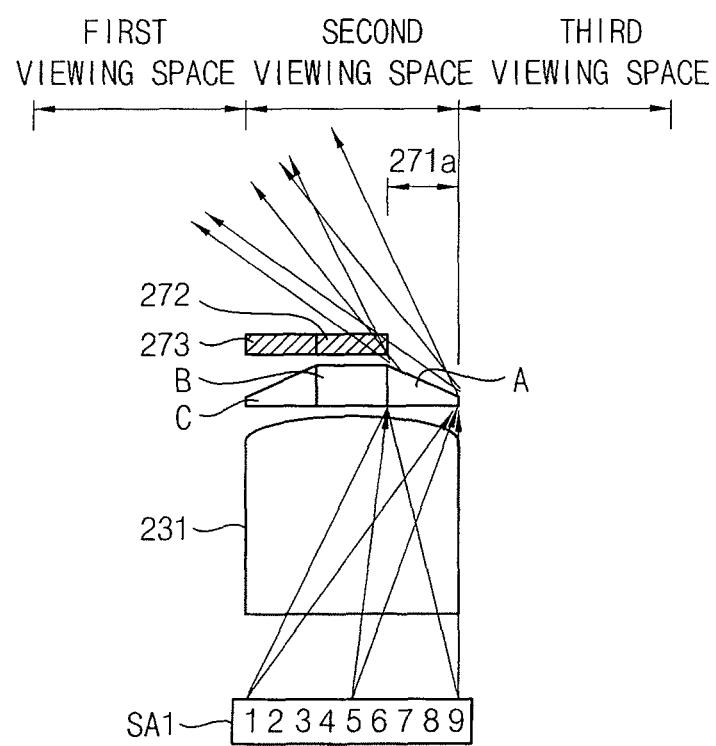

FIGS. 6A and 6B are conceptual diagrams showing a method of displaying a stereoscopic image during a first sub-frame interval.

Referring to FIGS. 1, 5, 6A and 6B, the light source driving part 120 provides the light source part 130 with a light source control signal of high level in accordance with a control of the control part 110. Then, the light source part 130 is driven to provide the display panel 150 with lights.

During the first frame interval period, the display driving part 140 displays a first view image corresponding to a first viewing space on the display panel 150 in accordance with a control of the control part 110. The display panel 150 is divided into, for example, a plurality of sub-areas SA1, SA2 and SA3, and each of the sub-areas SA1, SA2 and SA3 displays a sub-image of the first view image. The display panel 150 displays the first view image that is a 2D image.

The lenticular plate 230 converts a sub-image of the first view image displayed on each of the sub-areas SA1, SA2 and SA3 into the nine stereoscopic images having the different directional characteristics.

The spatial division plate 240 emits the nine stereoscopic images toward the first, second and third viewing spaces through the first, second and third light-exiting portions A, B and C, respectively.

The temporal division driving part 160 controls the opening and the closing of the first, second and third shutters 271, 272 and 273 of the temporal division part 270. That is, the temporal division driving part 160 provides the first shutter 271 corresponding to the first viewing space with a first shutter control signal of high level, and provides the second and third shutters 272 and 273 corresponding to the second and third viewing spaces with the second and third shutter control signals of low level, respectively. Thus, the first shutter 271 is opened, and the second and third shutters 272 and 273 are closed.

The nine stereoscopic images emitted at the first light-exiting portion A are emitted toward the first viewing space through a first shutter area 271$a$ in which the first shutter 271 is opened. Thus, a viewer may view the nine stereoscopic images emitted toward the first viewing space during the first sub-frame interval period.

Figure 6C:
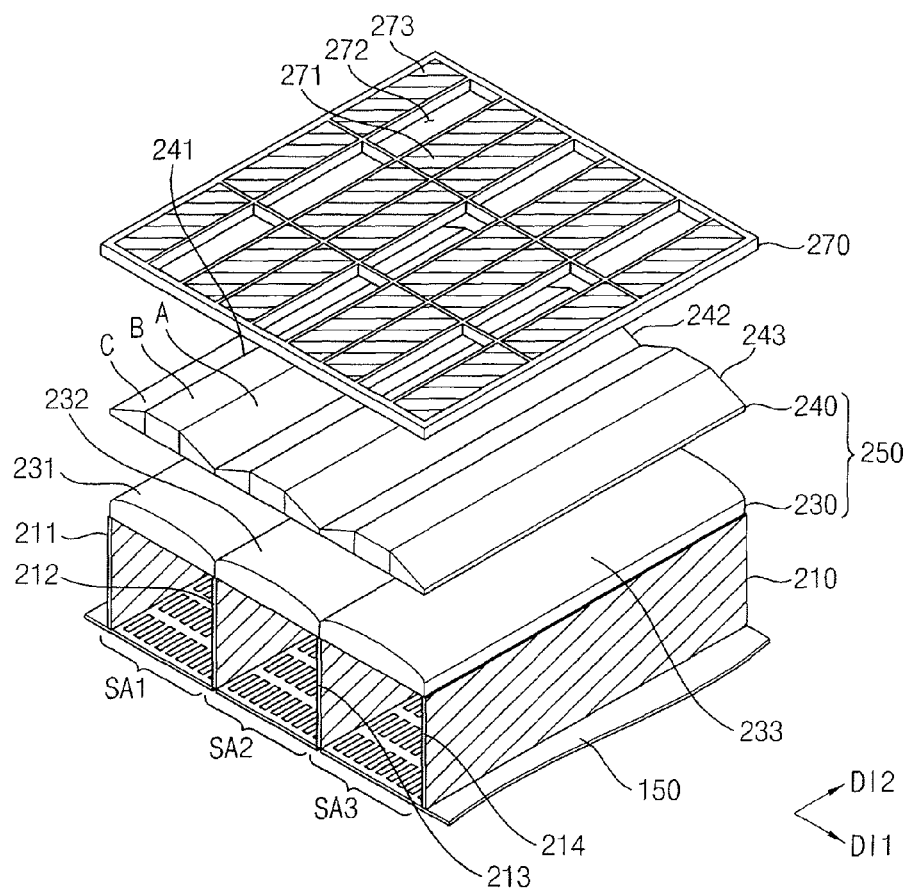
Figure 6D:
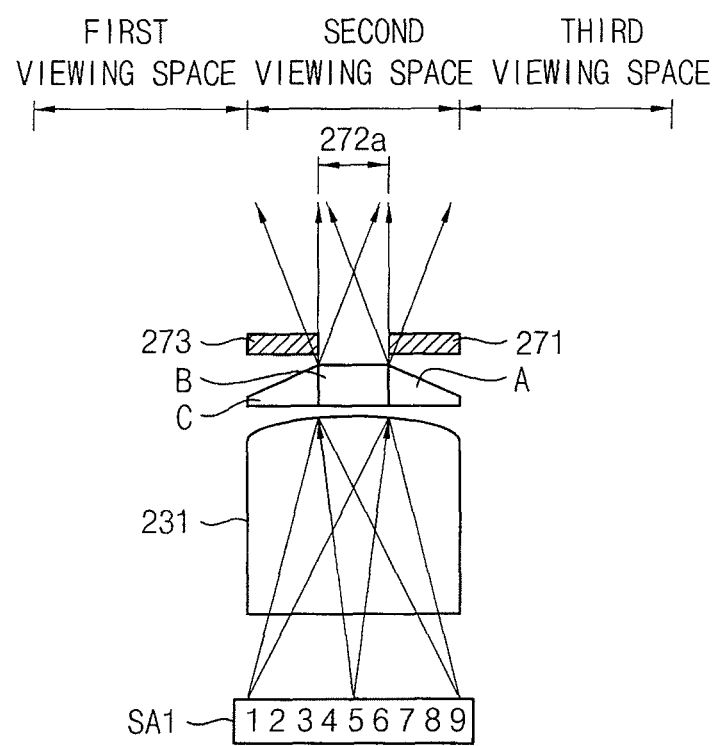

FIGS. 6C and 6D are conceptual diagrams showing a method of displaying a stereoscopic image during a second sub-frame interval.

Referring to FIGS. 1, 5, 6C and 6D, during the second frame interval period, the display driving part 140 displays a second view image corresponding to a second viewing space on the display panel 150 in accordance with a control of the control part 110. The display panel 150 is divided into, for example, a plurality of sub-areas SA1, SA2 and SA3, and each of the sub-areas SA1, SA2 and SA3 displays a sub-image of the second view image. The display panel 150 displays the second view image that is a 2D image.

The lenticular plate 230 converts a sub-image of the first view image displayed on each of the sub-areas SA1, SA2 and SA3 into the nine stereoscopic images having the different directional characteristics.

The spatial division plate 240 emits the nine stereoscopic images toward the first, second and third viewing spaces through the first, second and third light-exiting portions A, B and C.

The temporal division driving part 160 provides the second shutter 272 corresponding to the second viewing space with a second shutter control signal of high level, and provides the first and third shutters 271 and 273 corresponding to the first and third viewing spaces with the first and third shutter control signals of low level, respectively. Thus, the second shutter 272 is opened, and the first and third shutters 271 and 273 are closed.

The nine stereoscopic images emitted at the second light-exiting portion B are emitted toward the second viewing space through a second shutter area 272$a$ in which the second shutter 272 is opened. Thus, a viewer may view the nine stereoscopic images emitted toward the second viewing space during the second sub-frame interval period.

Figure 6E:
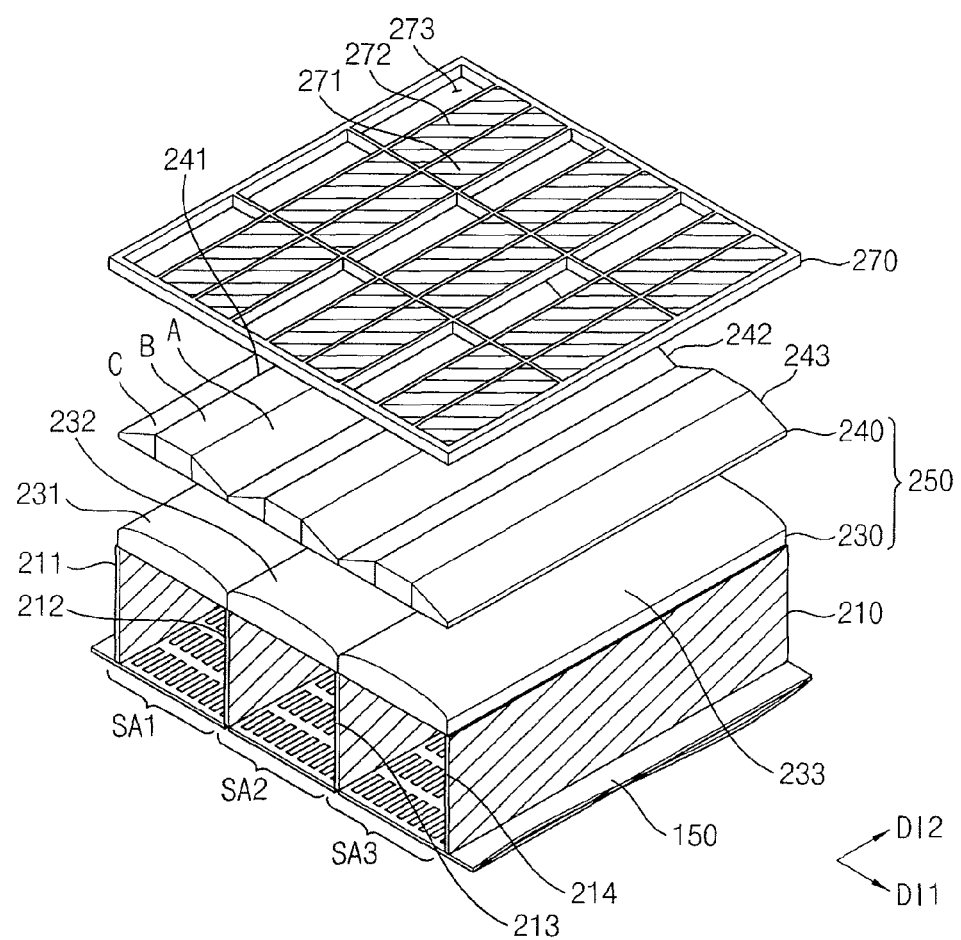
Figure 6F:
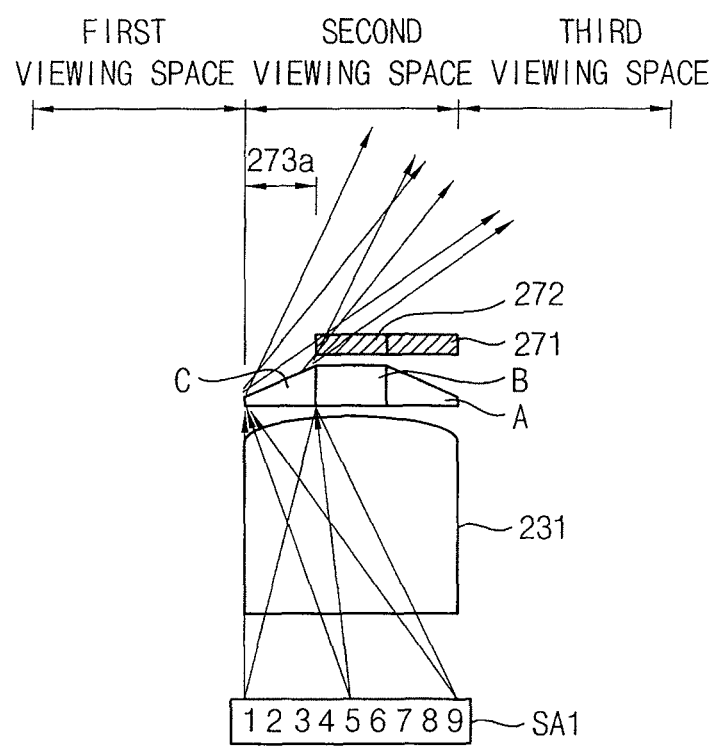

FIGS. 6E and 6F are conceptual diagrams showing a method of displaying a stereoscopic image during a third sub-frame interval.

Referring to FIGS. 1, 5, 6E and 6F, during the third frame interval period, the display driving part 140 displays a third view image corresponding to a third viewing space on the display panel 150 in accordance with a control of the control part 110. The display panel 150 is divided into, for example, a plurality of sub-areas SA1, SA2 and SA3, and each of the sub-areas SA1, SA2 and SA3 displays a sub-image of the second view image. The display panel 150 displays the third view image that is a 2D image.

The lenticular plate 230 converts a sub-image of the first view image displayed on each of the sub-areas SA1, SA2 and SA3 into the nine stereoscopic images having the different directional characteristics.

The spatial division plate 240 emits the nine stereoscopic images toward the first, second and third viewing spaces through the first, second and third light-exiting portions A, B and C, respectively.

The temporal division driving part 160 provides the third shutter 273 corresponding to the third viewing space with a third shutter control signal of high level, and provides the first and second shutters 271 and 272 corresponding to the first and second viewing spaces with the first and second shutter control signals of low level, respectively. Thus, the third shutter 273 is opened, and the first and second shutters 271 and 272 are closed.

The nine stereoscopic images emitted at the third light-exiting portion C are emitted toward the third viewing space through a third shutter area 273$a$ in which the third shutter 273 is opened. Thus, a viewer may view the nine stereoscopic images emitted toward the third viewing space during the third sub-frame interval period.

Example Embodiment 2

Hereinafter, the same reference numerals will be used to refer to the same or like parts as those described in Example Embodiment 1, and any repetitive detailed explanation will be omitted.

Figure 7:
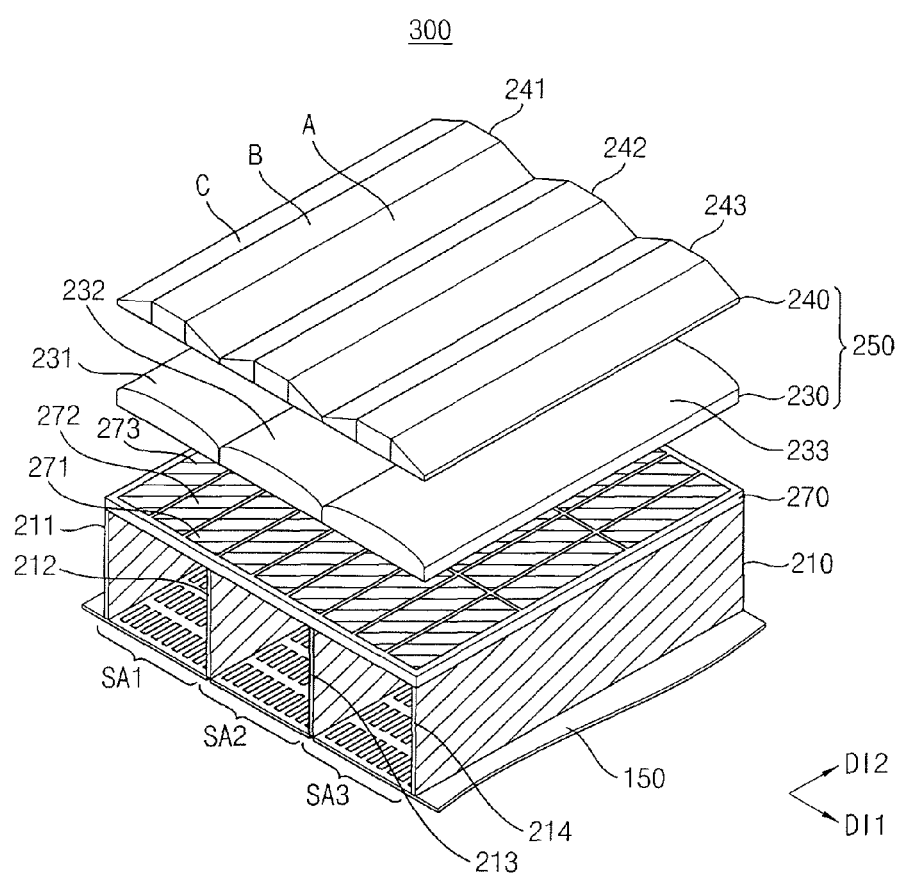
FIG. 7 is a perspective view illustrating an optical lens assembly according to an Example Embodiment of the present invention.

FIG. 7 is a perspective view illustrating an optical lens assembly according to Example Embodiment 2 of the present invention.

Referring to FIG. 7, the optical lens assembly 300 includes a partition wall part 210 disposed on a display panel 150, a temporal division part 270 disposed on the partition wall part 210, and a spatial division lenticular lens part 250 disposed on the temporal division part 270.

The partition wall part 210 is disposed in a vertical direction with respect to the display panel 150. The partition wall part 210 includes, for example, a plurality of partition walls 211, 212, 213 and 214 disposed by an interval of predetermined nine color pixels. The partition walls 211, 212, 213 and 214 may divide the display panel 150 into a first sub-area SA1, a second sub-area SA2 and a third sub-area SA3.

The temporal division part 270 is disposed on the partition wall part 210 to include k shutters (wherein, 'k' is a natural number) disposed in a position corresponding to the first to third sub-areas SA1, SA2 and SA3, respectively. For example, the temporal division part 270 includes a first shutter 271, a second shutter 272 and a third shutter 273.

The spatial division lens part 250 includes a lenticular plate 230 and a spatial division plate 240. The lenticular plate 230 is disposed on the temporal division part 270 to include, for example, a plurality of lenticular lenses 231, 232 and 233 respectively disposed on the sub-areas SA1, SA2 and SA3. For example, the lenticular lens 231 may convert a 2D image displayed on the first sub-area SA1 into stereoscopic images having nine directional characteristics.

The spatial division plate 240 is disposed on the lenticular plate 23 to include, for example, a plurality of spatial division lenses 241, 242 and 243 disposed on a position corresponding to the sub-areas SA1, SA2 and SA3, respectively.

For example, each of the spatial division lenses 241, 242 and 243 includes a first light-exiting portion A, a second light-exiting portion B and a third light-exiting portion C. The first light-exiting portion A has a first light-exiting surface having a first inclined angle ϕc with respect to a light incident surface in which light is incident, and the second light-exiting portion B has a second light-exiting surface in parallel with the light incident surface. The third light-exiting portion C has a third light-exiting surface having a second inclined angle −ϕc with respect to a light incident surface in which light is incident. The first inclined angle ϕ c is substantially equal to the second inclined angle −ϕc, and a direction of first inclined angle ϕc is opposite to that of the second inclined angle −ϕc.

The optical lens assembly 300 of Example Embodiment 2 is substantially the same as the optical lens assembly 200 of Example Embodiment 1 except for at least a position of the temporal division part 270. Moreover, a method of displaying a stereoscopic image in accordance with a stereoscopic image display device including the optical lens assembly 300 of Example Embodiment 2 is substantially the same as the method of Example Embodiment 1. Thus, any repetitive detailed explanation thereof will be omitted.

Example Embodiment 3

Figure 8:
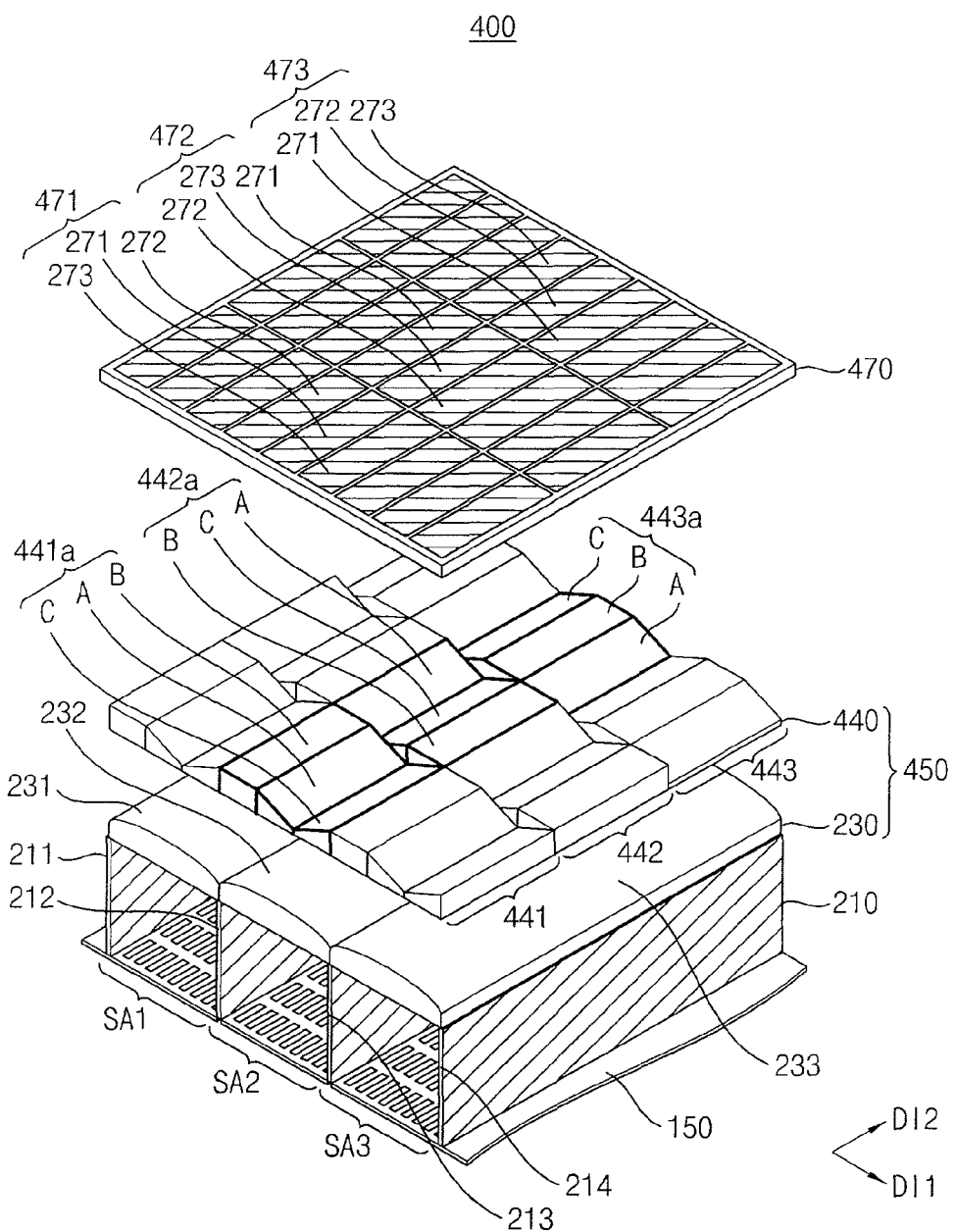
FIG. 8 is a perspective view illustrating an optical lens assembly according to an Example Embodiment of the present invention.

FIG. 8 is a perspective view illustrating an optical lens assembly according to Example Embodiment 3 of the present invention.

Referring to FIGS. 1 and 8, the optical lens assembly 400 includes a partition wall part 210, a spatial division lenticular lens part 450 and a temporal division part 270.

The partition wall part 210 is disposed in a vertical direction with respect to the display panel 150. The partition wall part 210 includes a first partition wall 211, a second partition wall 212, a third partition wall 213 and a fourth partition wall 214 that are disposed between predetermined nine color pixels. The first to fourth partition wall parts 211, 212, 213, 214 may divide the display panel 150 into a first sub-area SA1, a second sub-area SA2 and a third sub-area SA3. When a resolution of the display panel 150 is p×q (wherein 'p' and 'q' are natural numbers), the first sub-area SA1 may correspond to 9×q color pixels. The partition wall part 210 may include, for example, a non-transparent material which blocks lights.

The spatial division lenticular lens part 450 includes a lenticular plate 230 and a spatial division plate 440. The lenticular plate 230 includes, for example, a plurality of lenticular lenses 231, 232 and 233 corresponding to the first to third sub-area SA1, SA2 and SA3, respectively. For example, the lenticular lenses 231, 232 and 233 are arranged in the first direction DI1, and each of the lenticular lenses 231, 232 and 233 is extended in the second direction DI2. For example, the lenticular lens 231 refracts a 2D image displayed on the first sub-area SA1 into stereoscopic images having nine directional characteristics.

The spatial division plate 440 is disposed on the lenticular plate 230 to include, for example, a plurality of lens parts 441, 442 and 443. The lens parts 441, 442 and 443 are extended, for example, in the first direction DI1 to be arranged in the second direction DI2.

The first lens part 441 includes, for example, a plurality of first spatial division lenses 441a arranged in the first direction DI1. Each of the first spatial division lenses 441a includes, for example, a first light-exiting portion A, a second light-exiting portion B and a third light-exiting portion C. The first light-exiting portion A has a first light-exiting surface having a first inclined angle ϕc with respect to a light incident surface in which light is incident, and the second light-exiting portion B has a second light-exiting surface in parallel with the light incident surface. The third light-exiting portion C has a third light-exiting surface having a second inclined angle −ϕc with respect to a light incident surface in which light is incident. An arrangement sequence in which the third light-exiting portion C is firstly arranged, the first light-exiting portion A is secondly arranged to be adjacent to the third light-exiting portion C and the second light-exiting portion B is thirdly arranged to be adjacent to the first light-exiting portion A is obtained.

The second lens part 442 includes, for example, a plurality of second spatial division lenses 442a arranged in the second direction DI2. Each of the second spatial division lenses 442a includes, for example, a first light-exiting portion A, a second light-exiting portion B and a third light-exiting portion C. An arrangement sequence in which the second light-exiting portion B is firstly arranged, the third light-exiting portion C is secondly arranged to be adjacent to the second light-exiting portion B and the first light-exiting portion A is thirdly arranged to be adjacent to the third light-exiting portion C is obtained.

The third lens part 443 includes, for example, a plurality of third spatial division lenses 443a arranged in the first direction DI1. Each of the third spatial division lenses 443a includes, for example, a first light-exiting portion A, a second light-exiting portion B and a third light-exiting portion C. An arrangement sequence in which the first light-exiting portion A is firstly arranged, the second light-exiting portion B is secondly arranged to be adjacent to the first light-exiting portion A and the third light-exiting portion C is thirdly arranged to be adjacent to the second light-exiting portion B is obtained.

Each of the first, second and third spatial division lenses 441a, 442a and 443a may have a unit size corresponding to color pixels of N×N/K, for example, 9×3. In this case, 'K' is the number of color pixels. For example, when a unit pixel of the display panel 150 includes a red pixel R, a green pixel G and a blue pixel B, 'K' is 3.

Consequentially, an arrangement sequence [C, A and B] of light-exiting portions of the first spatial division lens 441*a* may be different from an arrangement sequence [B, C and A] of light-exiting portions of the second spatial division lens 442*a*. Moreover, an arrangement sequence [A, B and C] of light-exiting portions of the third spatial division lens 443*a* may be different from an arrangement sequence [C, A and B] of light-exiting portions of the first spatial division lens 441*a*, and may be different from an arrangement sequence [B, C and A] of light-exiting portions of the second spatial division lens 442*a*.

The temporal division part 470 is disposed on the spatial division plate 440 to include, for example, a first shutter part 471, a second shutter part 472 and a third shutter part 473 which correspond with the first, second and third lens parts 441, 442 and 443, respectively. Each of the first, second and third shutter parts 471, 472 and 473 includes the first, second and third shutters 271, 272 and 273.

The first shutter part 471 includes the third, first and second shutters 273, 271 and 272 sequentially disposed in accordance with arrangement sequences C, A and B of light-exiting portions of the first spatial division lens 441*a*.

The second shutter part 472 includes the second, third and first shutters 272, 273 and 271 sequentially disposed in accordance with arrangement sequences B, C and A of light-exiting portions of the second spatial division lens 442*a*.

The third shutter part 473 includes the first, second and third shutters 271, 272 and 273 sequentially disposed in accordance with arrangement sequences A, B and C of light-exiting portions of the third spatial division lens 443*a*.

The first, second and third shutters 271, 272 and 273 of the temporal division part 470 are opened in a temporal division method in accordance with an image displayed on the display panel 150. For example, when the first view image is displayed on the display panel 150, the first shutter 271 is opened and the second and third shutters 272 and 273 are closed so that nine stereoscopic images emitted through the first light-exiting portion A are emitted toward the first viewing space. Then, when the second view image is displayed on the display panel 150, the second shutter 272 is opened and the first and third shutters 271 and 273 are closed so that nine stereoscopic images emitted through the second light-exiting portion B are emitted toward the second viewing space. When the third view image is displayed on the display panel 150, the third shutter 273 is opened and the first and second shutters 271 and 272 are closed so that nine stereoscopic images emitted through the third light-exiting portion C are emitted toward the third viewing space.

As a result, as the nine stereoscopic images are emitted toward the first, second and third viewing spaces in a temporal division method, a viewer may view stereoscopic images having 3×9 directional characteristics. Thus, the temporal division method is used, so that a viewing angle (or the number of viewpoint) of a stereoscopic image may be increased.

FIGS. 9A to 9F are conceptual diagrams showing a method of displaying a stereoscopic image by the stereoscopic image display device including an optical lens assembly of FIG. 1.

Figure 9A:
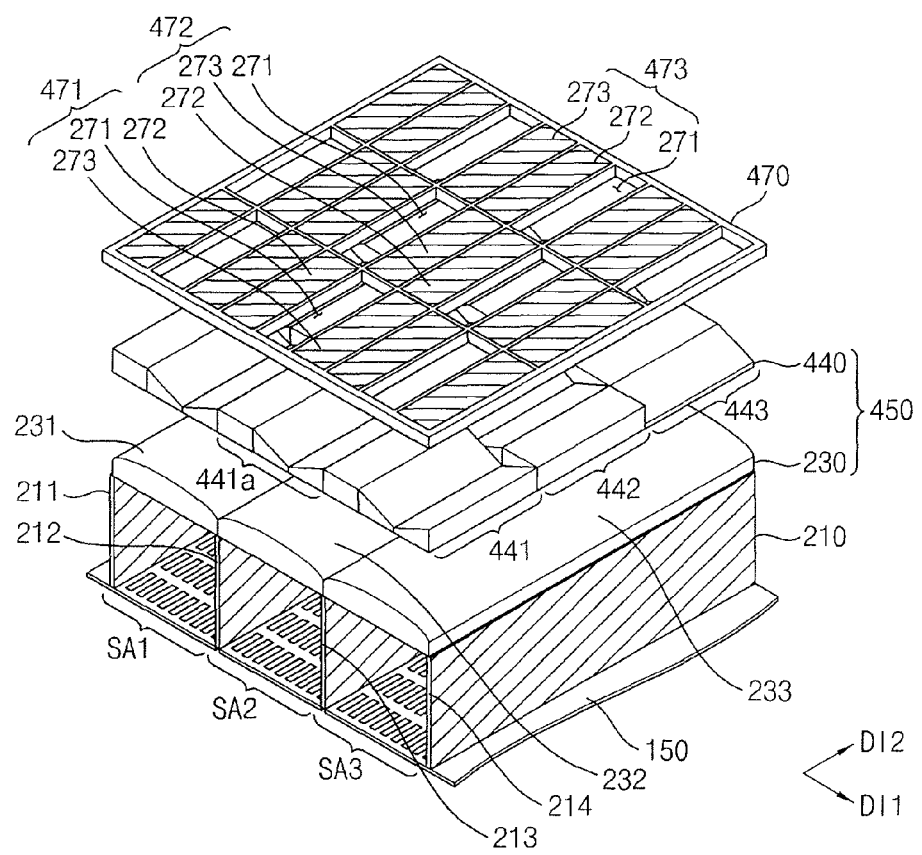
FIGS. 9A to 9F are conceptual diagrams showing a method of displaying a stereoscopic image by the stereoscopic image display device including an optical lens assembly of FIG. 1.
Figure 9B:
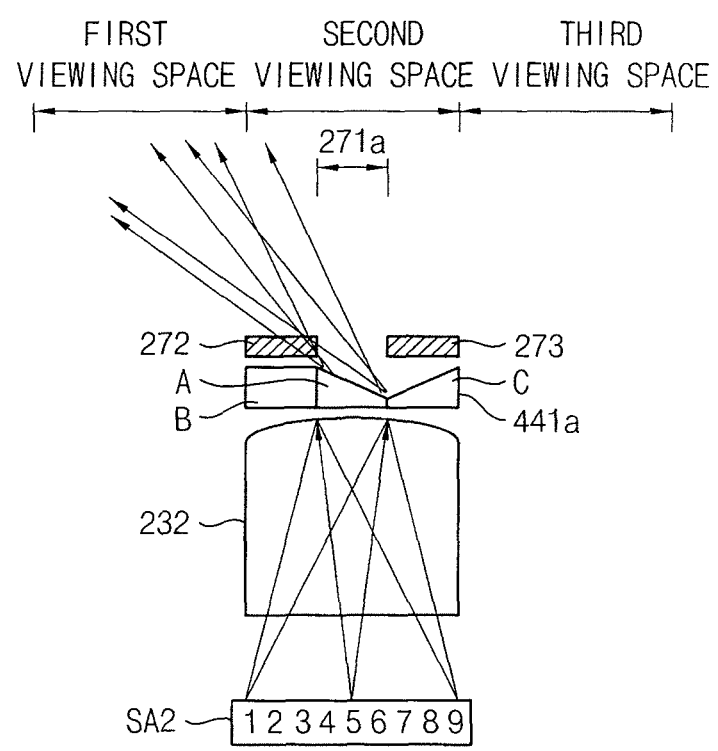
Figure 9C:
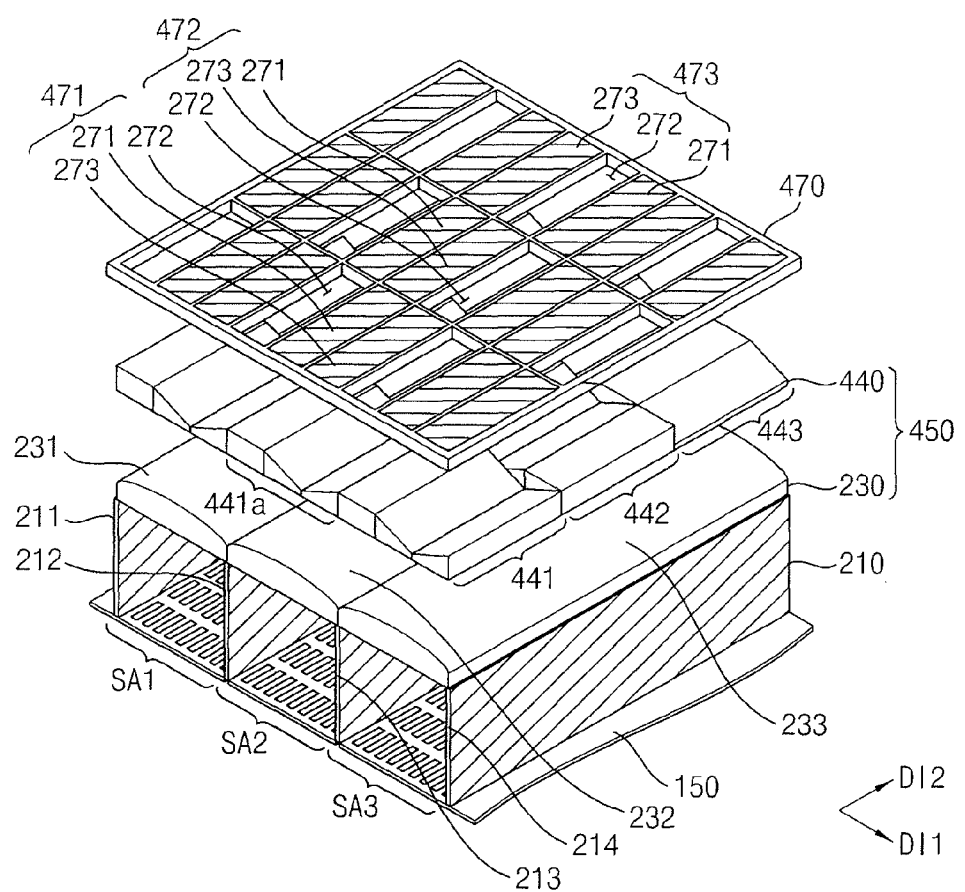

FIGS. 9A and 9B are conceptual diagrams showing a method of displaying a stereoscopic image during a first sub-frame interval period.

Referring to FIGS. 1, 5, 9A and 9B, the light source driving part 120 provides the light source part 130 with a light source control signal of high level in accordance with a control of the control part 110. Thus, the light source part 130 is driven to provide the display panel 150 with lights.

During the first sub-frame interval period, the display driving part 140 displays a first view image corresponding to a first viewing space on the display panel 150 in accordance with the controlling of the control part 110. The display panel 150 is divided into, for example, a plurality of sub-areas SA1, SA2 and SA3, and each of the sub-areas SA1, SA2 and SA3 displays a sub-image of the first view image. The display panel 150 displays the first view image that is a 2D image.

The lenticular plate 230 converts a sub-image of the first view image displayed on each of the sub-areas SA1, SA2 and SA3 into nine stereoscopic images which have the different directional characteristics.

The spatial division plate 240 emits the nine stereoscopic images toward the first, second and third viewing spaces through the first, second and third light-exiting portions A, B and C, respectively.

The temporal division driving part 160 controls the opening and the closing of the first, second and third shutters 271, 272 and 273 of the temporal division part 270. That is, the temporal division driving part 160 provides the first shutter 271 corresponding to the first viewing space with a first shutter control signal of high level, and provides the second and third shutters 272 and 273 corresponding to the second and third viewing spaces with the second and third shutter control signals of low level, respectively. Thus, the first shutter 271 is opened, and the second and third shutters 272 and 273 are closed.

The nine stereoscopic images emitted at the first light-exiting portion A are emitted toward the first viewing space through a first shutter area 271*a* in which the first shutter 271 is opened. Thus, a viewer may view the nine stereoscopic images emitted toward the first viewing space during the first sub-frame interval period.

Figure 9D:
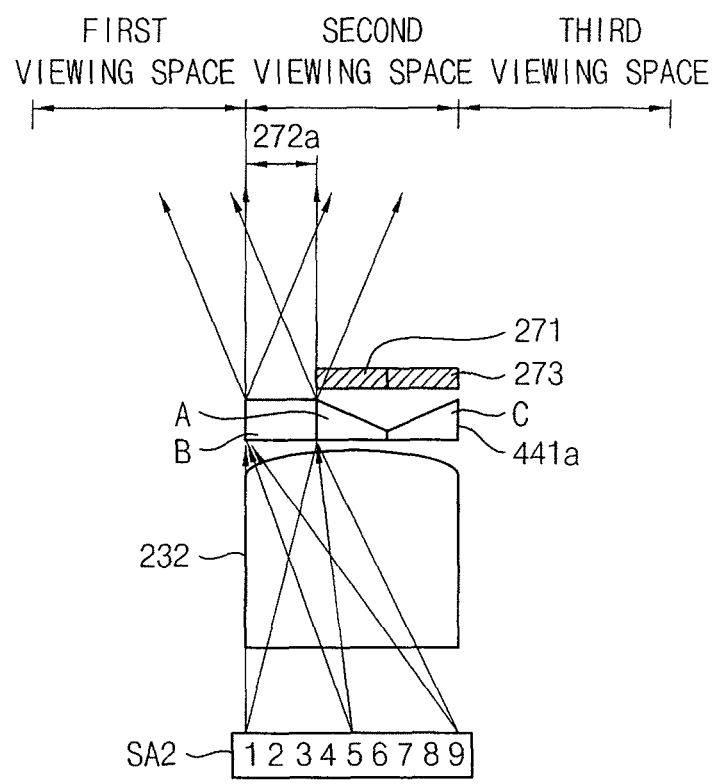

FIGS. 9A and 9D are conceptual diagrams showing a method of displaying a stereoscopic image during a second sub-frame interval period.

Referring to FIGS. 1, 5, 9C and 9D, during the second frame interval period, the display driving part 140 displays a second view image corresponding to a second viewing space on the display panel 150 in accordance with the controlling of the control part 110. The display panel 150 is divided into, for example, a plurality of sub-areas SA1, SA2 and SA3, and each of the sub-areas SA1, SA2 and SA3 displays a sub-image of the second view image. The display panel 150 displays the second view image that is a 2D image.

The lenticular plate 230 converts a sub-image of the first view image displayed on each of the sub-areas SA1, SA2 and SA3 into nine stereoscopic images which have the different directional characteristics.

The spatial division plate 240 emits the nine stereoscopic images toward the first, second and third viewing spaces through the first, second and third light-exiting portions A, B and C, respectively.

The temporal division driving part 160 provides the second shutter 272 corresponding to the second viewing space with a second shutter control signal of high level, and provides the first and third shutters 271 and 273 corresponding to the first and third viewing spaces with the first and third shutter control signals of low level, respectively. Thus, the second shutter 272 is opened, and the first and third shutters 271 and 273 are closed.

The nine stereoscopic images emitted at the second light-exiting portion B are emitted toward the second viewing space through a second shutter area 272*a* in which the second shutter 272 is opened. Thus, a viewer may view the nine stereoscopic images emitted toward the second viewing space during the second sub-frame interval period.

Figure 9E:
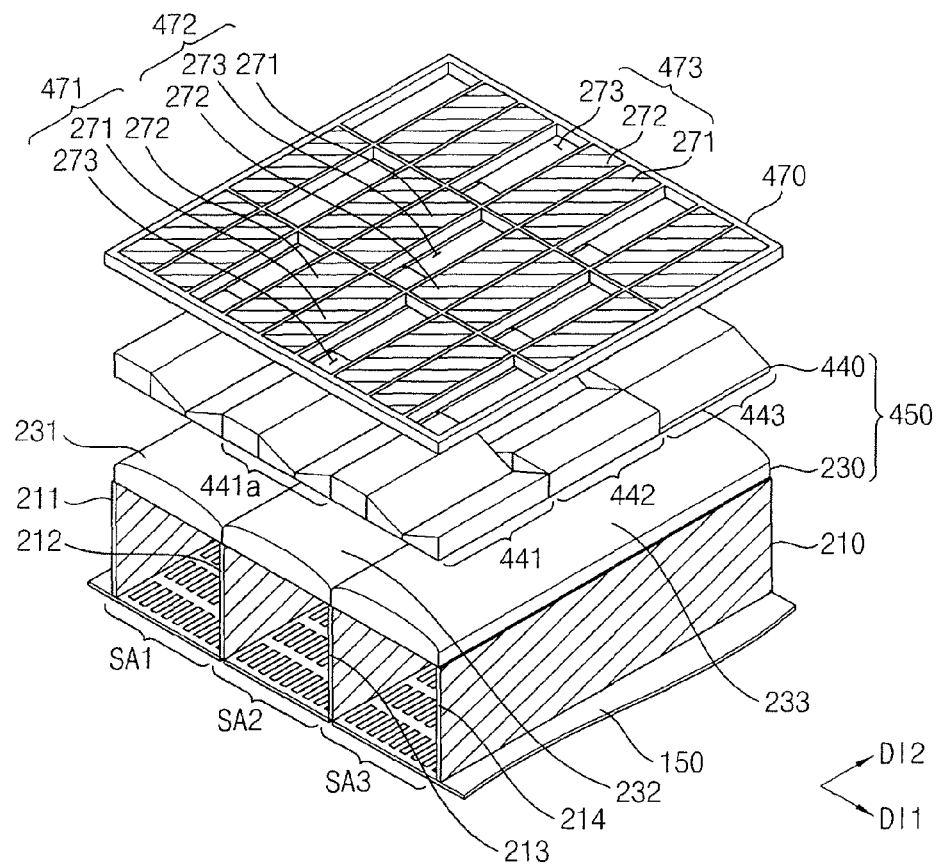
Figure 9F:
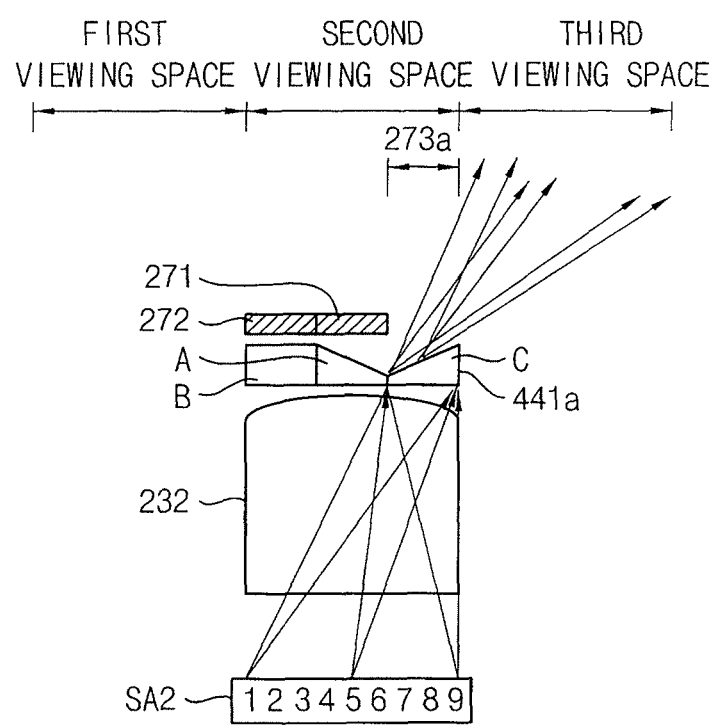

FIGS. 9E and 9F are conceptual diagrams showing a method of displaying a stereoscopic image during a third sub-frame interval period.

Referring to FIGS. 1, 5, 9E and 9F, during the third frame interval period, the display driving part 140 displays a third view image corresponding to a third viewing space on the display panel 150 in accordance with the controlling of the control part 110. The display panel 150 is divided into, for example, a plurality of sub-areas SA1, SA2 and SA3, and each of the sub-areas SA1, SA2 and SA3 displays a sub-image of the third view image. The display panel 150 displays the third view image that is a 2D image.

The lenticular plate 230 converts a sub-image of the first view image displayed on each of the sub-area SA1, SA2, SA3 into nine stereoscopic images which have the different directional characteristics.

The spatial division plate 240 emits the nine stereoscopic images toward the first, second and third viewing spaces through the first, second and third light-exiting portions A, B and C, respectively.

The temporal division driving part 160 provides the third shutter 273 corresponding to the third viewing space with a third shutter control signal of high level, and provides the first and second shutters 271 and 272 corresponding to the first and second viewing spaces with the first and second shutter control signals of low level, respectively. Thus, the third shutter 273 is opened, and the first and second shutters 271 and 272 are closed.

The nine stereoscopic images emitted at the third light-exiting portion C are toward the third viewing space through a third shutter area 273a in which the third shutter 273 is opened. Thus, a viewer may view the nine stereoscopic images emitted toward the third viewing space during the third sub-frame interval period.

In addition, the temporal division part 470 may be disposed between the partition wall part 210 and the lenticular plate 230 in similar to Example Embodiment 2. In this case, a method of displaying a stereoscopic image may be substantially the same as the methods of Example Embodiments 1 and 2, and thus a repetitive detailed explanation thereof will be omitted.

Example Embodiment 4

Figure 10:
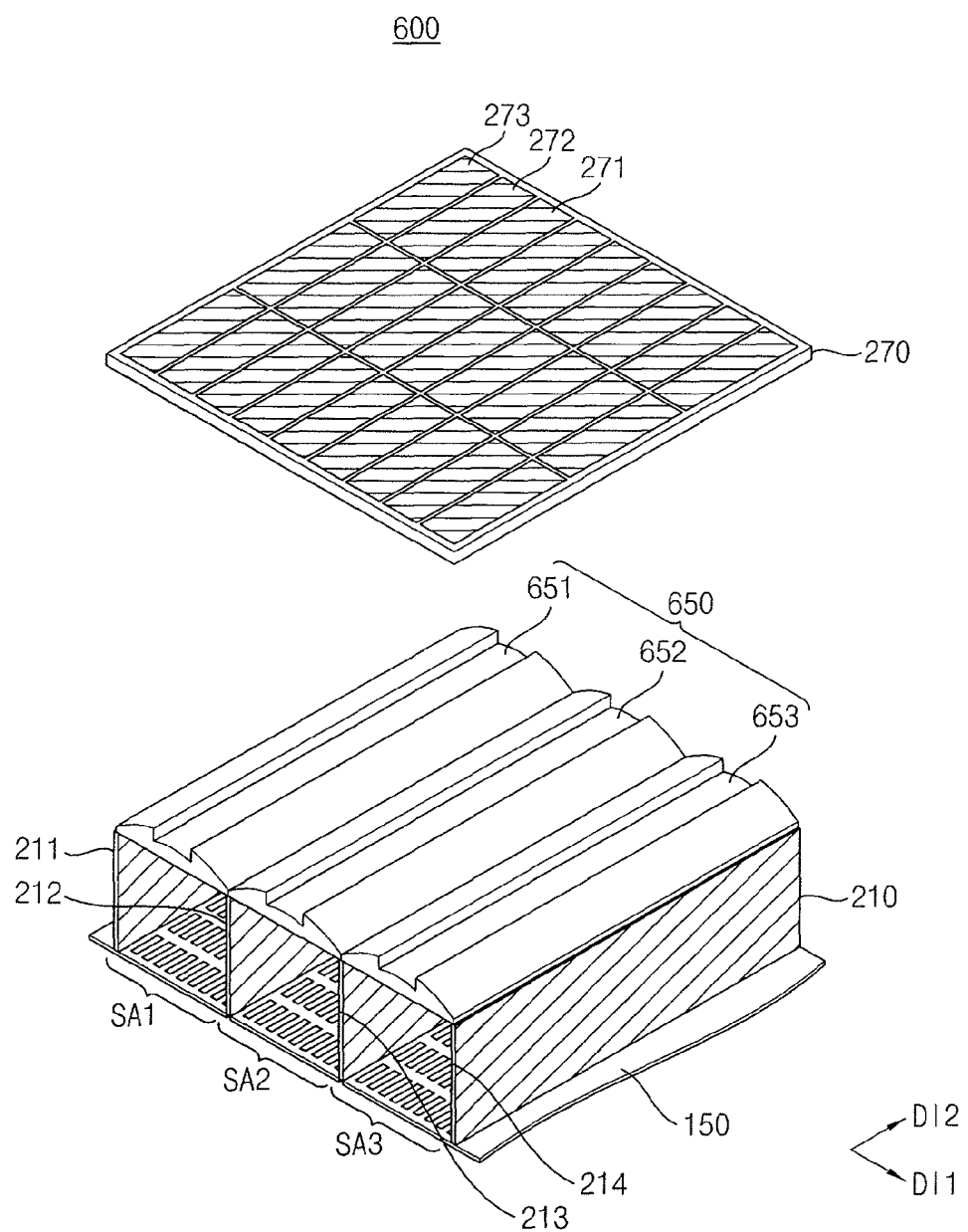
FIG. 10 is a perspective view illustrating an optical lens assembly according to an Example Embodiment of the present invention.
Figure 11:
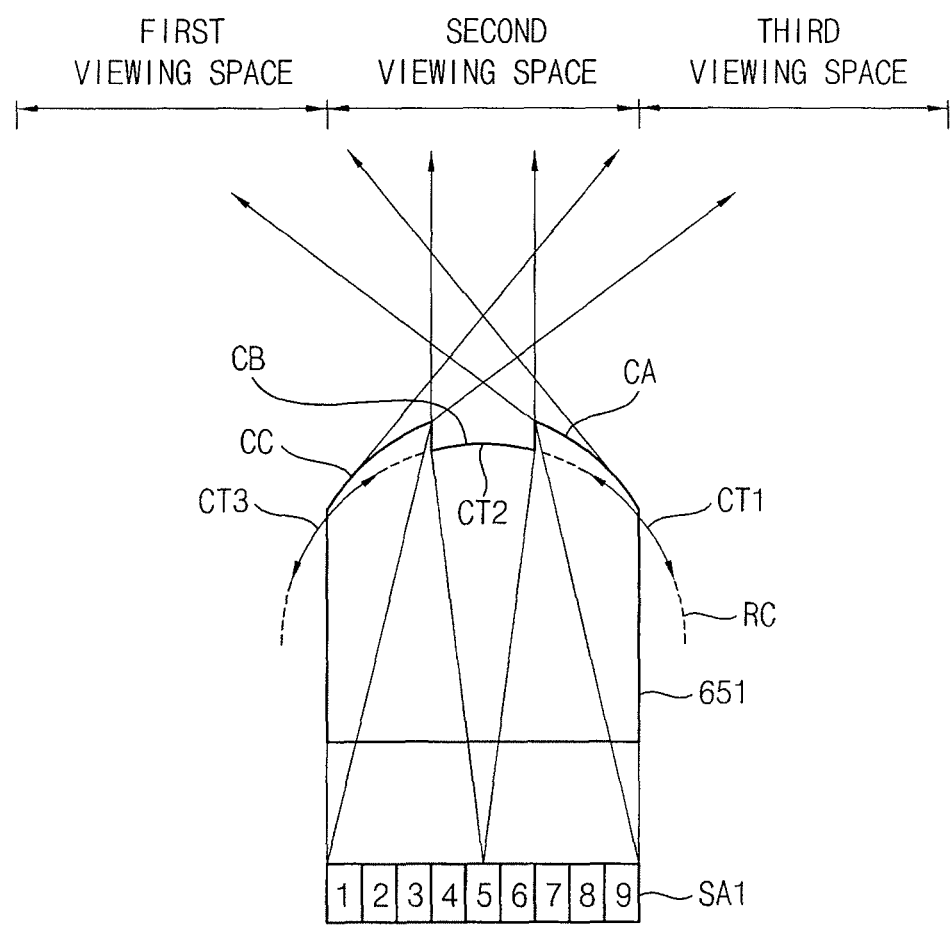
FIG. 11 is a conceptual diagram showing an optical principle of a spatial division lenticular lens part of FIG. 10.

FIG. 10 is a perspective view illustrating an optical lens assembly according to Example Embodiment 4 of the present invention. FIG. 11 is a conceptual diagram showing an optical principle of a spatial division lenticular lens part of FIG. 10.

Referring to FIGS. 10 and 11, the optical lens assembly 600 includes a partition wall part 210, a spatial division lenticular lens part 650 and a temporal division part 270. The partition wall part 210 is substantially the same as that of Example Embodiment 1, and thus a detailed description thereof will be omitted.

The spatial division lenticular lens part 650 includes, for example, a plurality of spatial division lenticular lenses 651, 652 and 653 respectively corresponding to the sub-areas SA1, SA2 and SA3. For example, the spatial division lenticular lenses 651, 652 and 653 are arranged in the first direction DI1. Each of the spatial division lenticular lenses 651, 652, 653 is extended along, for example, the second direction DI2. For example, the spatial division lenticular lens 651 may convert a 2D image displayed on the first sub-area SA1 to emit the converted stereoscopic images toward first, second and third view spaces, respectively.

Each of the spatial division lenticular lenses 651, 652 and 653 includes, for example, a first light-exiting portion CA, a second light-exiting portion CB and a third light-exiting portion CC.

The first light-exiting portion CA, the second light-exiting portion CB and the third light-exiting portion CC have a first curvature CT1, a second curvature CT2 and a third curvature CT3, respectively. The first curvature CT1 has a curvature corresponding to a first portion of a reference arc RC, the second curvature CT2 has a curvature corresponding to a second portion of the reference arc RC, and the third curvature CT3 has a curvature corresponding to a third portion of the reference arc RC.

The first curvature CT1 has a slope adjacent to a first inclined angle φc as described in Example Embodiment 1 and directional characteristics, and the third curvature CT3 has a slope adjacent to the second inclined angle −φc and directional characteristics. The second curvature CT2 has a slope adjacent to a light incident surface and directional characteristics.

As the first light-exiting portion CA has the first curvature CT1 that is a portion of the reference curvature RC, 2D images, which are displayed on a sub-area SA1 of the display panel 150, are converted into the nine stereoscopic images having the directions that are different from each other. Moreover, as the first curvature CT1 has a slope and a direction approximately to the first inclined angle φc, the nine stereoscopic images are emitted toward a first viewing space.

As the second light-exiting portion CA has the second curvature CT2 that is a portion of the reference curvature RC, 2D images, which are displayed on a sub-area SA1 of the display panel 150, are converted into the nine stereoscopic images. Moreover, as the second curvature CT2 is in parallel with the incident surface, the nine stereoscopic images are emitted toward a second viewing space.

As the third light-exiting portion CC has the third curvature CT3 that is a portion of the reference curvature RC, 2D images, which are displayed on a sub-area SA1 of the display panel 150, are converted into the nine stereoscopic images. Moreover, as the third curvature CT3 has a slope and a direction approximately to the second inclined angle −φc, the nine stereoscopic images are emitted toward a third viewing space.

The temporal division part 270 is disposed on the spatial division lenticular lens part 650 to include, for example, a first shutter 271, a second shutter 272 and a third shutter 273 respectively corresponding to the first, second and third light-exiting portions CA, CB and CC of the spatial division lenticular lens 651. For example, the first shutter 271 is disposed in a position corresponding to the first light-exiting portion CA, and the second shutter 272 is disposed in a position corresponding to the second light-exiting portion CB. The third shutter 273 is disposed in a position corresponding to the third light-exiting portion CC.

A method of displaying a stereoscopic image in accordance with a stereoscopic image display device including the optical lens assembly of Example Embodiment 4 is substantially the same as the method of Example Embodiment 1. Moreover, the temporal division part 270 may be disposed between the partition wall part 210 and the spatial division lenticular lens plate 650 in similar fashion as in Example Embodiment 2. In this case, a method of displaying a stereoscopic image is substantially the same as the method of Example Embodiment 1, and thus a repetitive detailed explanation thereof will be omitted.

Example Embodiment 5

Figure 12:
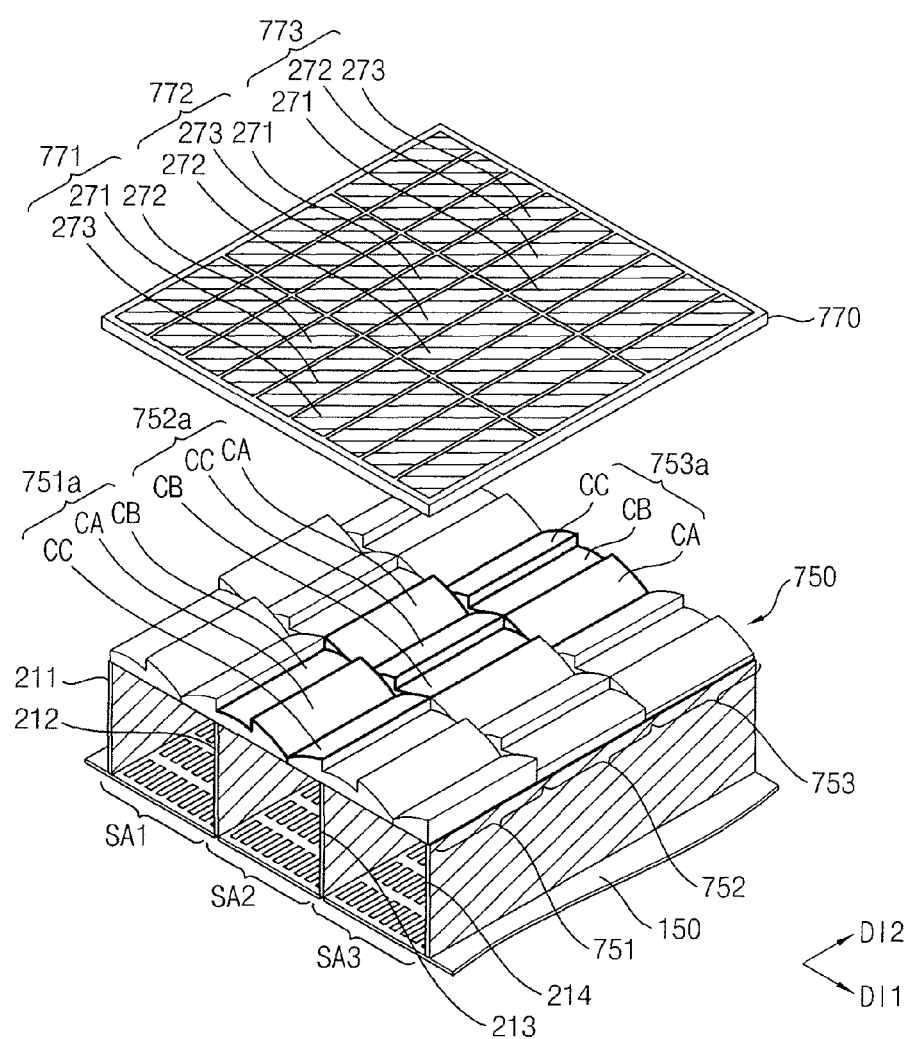
FIG. 12 is a perspective view illustrating an optical lens assembly according to an Example Embodiment of the present invention.

FIG. 12 is a perspective view illustrating an optical lens assembly according to Example Embodiment 5 of the present invention.

Referring to FIGS. 11 and 12, the optical lens assembly 700 includes a partition wall part 210, a spatial division lenticular lens part 750 and a temporal division part 470. The partition wall part 210 is substantially the same as that of Example Embodiment 1, and thus a detailed description thereof will be omitted.

The spatial division lenticular lens part 750 is disposed on the partition wall part 210. The spatial division lenticular lens part 750 includes a first lens part 751, a second lens part 752 and a third lens part 753 that are extended along the first direction DI1 and are arranged along the second direction DI2.

The first lens part 751 includes, for example, a plurality of first spatial division lenticular lenses 751a arranged in the first direction DI1. Each of the first spatial division lenticular lenses 751a includes, for example, a first light-exiting portion CA having the first curvature CT1, a second light-exiting portion CB having the second curvature CT2 and a third light-exiting portion CC having the third curvature CT3. An arrangement sequence in which the third light-exiting portion CC is firstly arranged, the first light-exiting portion CA is secondly arranged to be adjacent to the third light-exiting portion CC and the second light-exiting portion CB is thirdly arranged to be adjacent to the first light-exiting portion CA is obtained.

The second lens part 752 includes, for example, a plurality of second spatial division lenticular lenses 752a arranged in the first direction DI1. Each of the second spatial division lenticular lens 752a includes, for example, the first, second and third light-exiting portions CA, CB and CC. An arrangement sequence in which the second light-exiting portion CB is firstly arranged, the third light-exiting portion CC is secondly arranged to be adjacent to the second light-exiting portion CB and the first light-exiting portion CA is thirdly arranged to be adjacent to the third light-exiting portion CC is obtained.

The third lens part 753 includes, for example, a plurality of third spatial division lenticular lenses 753a arranged in the first direction DI1. Each of the third spatial division lenticular lens 753a includes, for example, the first, second and third light-exiting portions CA, CB and CC. An arrangement sequence in which the first light-exiting portion CA is firstly arranged, the second light-exiting portion CB is secondly arranged to be adjacent to the first light-exiting portion CA and the third light-exiting portion CC is thirdly arranged to be adjacent to the second light-exiting portion CB is obtained.

For example, each of the first, second and third spatial division lenticular lenses 751a, 752a and 753a may have a unit size corresponding to 9×3 color pixels.

Consequentially, an arrangement sequence [CC, CA and CB] of light-exiting portions of the first spatial division lenticular lens 751a may be different from an arrangement sequence [CB, CC and CA] of light-exiting portions of the second spatial division lenticular lens 752a. Moreover, an arrangement sequence [CA, CB and CC] of light-exiting portions of the third spatial division lenticular lens 753a may be different from an arrangement sequence [CC, CA and CB] of light-exiting portions of the first spatial division lenticular lens 751a, and may be different from an arrangement sequence [CB, CC and CA] of light-exiting portions of the second spatial division lenticular lens 752a.

The temporal division part 470 is disposed on the spatial division lenticular lens part 750 to include, for example, a first shutter part 471, a second shutter part 472 and a third shutter part 473 in correspondence with the first, second and third lens parts 751, 752 and 753, respectively. Each of the first, second and third shutter parts 471, 472 and 473 includes, for example, the first, second and third shutters 271, 272 and 273.

The first shutter part 471 includes the third, first and second shutters 273, 271 and 272 sequentially disposed in accordance with arrangement sequences CC, CA and CB of light-exiting portions of the first spatial division lenticular lens 751a.

The second shutter part 472 includes the second, third and first shutters 272, 273 and 271 sequentially disposed in accordance with arrangement sequences CB, CC and CA of light-exiting portions of the second spatial division lenticular lens 752a.

The third shutter part 473 includes the first, second and third shutters 271, 272 and 273 sequentially disposed in accordance with arrangement sequences CA, CB and CC of light-exiting portions of the third spatial division lenticular lens 753a.

The first, second and third shutters 271, 272 and 273 of the temporal division part 470 are opened in accordance with first, second and third view images displayed on the display panel 150.

A method of displaying a stereoscopic image in accordance with a stereoscopic image display device including the optical lens assembly of Example Embodiment 5 is substantially the same as the method of Example Embodiment 1. Moreover, the temporal division part 470 may be disposed between the partition wall part 210 and the spatial division lenticular lens plate 750 in similar fashion as in Example Embodiment 2. In this case, a method of displaying a stereoscopic image is substantially the same as the method of Example Embodiment 1, and thus a repetitive detailed explanation thereof will be omitted.

As described above, according to the present invention, stereoscopic images having N directional characteristics may be emitted toward M viewing spaces in a temporal division type, so that a viewing angle (or the number of viewpoint) of stereoscopic images may be increased. Thus, display quality of the stereoscopic image may be enhanced.

Having described the example embodiments of the present invention, it is further noted that it is readily apparent to those of reasonable skill in the art that various modifications may be made without departing from the spirit and scope of the invention which is defined by the metes and bounds of the appended claims.

What is claimed is:

1. A method of displaying a stereoscopic image, the method comprising:
   temporally dividing at least two view images corresponding to at least two viewing spaces to display the temporally divided image on a display panel; and
   converting the view image displayed on the display panel into N stereoscopic images in which directions of the view images are different from each other to emit the converted view image toward a viewing space corresponding to the view image displayed on the display panel using a spatial division lenticular lens part, wherein, 'N' is a natural number of no less than two,
   wherein the displaying of the temporally divided image on the display panel comprises:
   converting an image received during a frame interval period into the at least two view images;
   temporally dividing the frame interval period into at least two sub-frame interval periods to display the at least two view images on the display panel,
   displaying a first view image on the display panel during a first sub-frame interval period of the frame interval period, converting the first view image into N stereoscopic images in which directions thereof are different from each other using the spatial division lenticular lens part, refracting the N stereoscopic images using the spatial division lenticular lens part, emitting the refracted N-stereoscopic images from the spatial division lenticular lens part toward a first viewing space corresponding to the first view image, displaying a second view image on the display panel during a second sub-frame interval period of the frame interval period, converting the second view image into N stereoscopic images in which directions thereof are different from each other using the spatial division lenticular lens part, and emitting the N stereoscopic images from the spatial division lenticular lens part toward a second viewing space corresponding to the second view image without refracting the N stereoscopic images, wherein in one of the first sub-frame interval period or the second sub-frame interval period the N stereoscopic images are refracted by the spatial division lenticular lens part and the refracted N stereoscopic images are emitted from the spatial division lenticular lens part toward one of the first or second viewing spaces and wherein in the other one of the first sub-frame interval period or the second sub-frame interval period the N stereoscopic images are emitted from the spatial division lenticular lens part toward the other one of the first or second viewing spaces without being refracted.

2. The method of claim 1, wherein during one of the first or second sub-frame interval periods the N stereoscopic images emitted from the spatial division lenticular lens part toward the first or second viewing spaces are penetrated into one of the first or second viewing spaces corresponding to the view image displayed on the display panel through a temporal division part and wherein the N stereoscopic images emitted from the spatial division lenticular lens part toward the remaining one of the first or second viewing spaces are blocked from penetrating into the remaining one of the first or second viewing spaces by the temporal division part, wherein the temporal division part comprises at least two shutters respectively corresponding to the first and second viewing spaces, the temporal division part selectively opening and closing the at least two shutters to emit the N stereoscopic images received from the spatial division lenticular lens part toward a viewing space corresponding to the view image displayed on the display panel.

3. The method of claim 1, further comprising:

displaying a third view image on the display panel during a third sub-frame interval period of the frame interval period;

converting the third view image into N stereoscopic images in which directions thereof are different from each other using the spatial division lenticular lens part;

refracting the N stereoscopic images using the spatial division lenticular lens part; and emitting the refracted N-stereoscopic images from the spatial division lenticular lens toward a third viewing space corresponding to the third view image.

4. A stereoscopic image display device comprising:

a display panel comprising a plurality of pixels, the display panel temporally dividing at least two view images corresponding to at least two viewing spaces to display the temporally divided image on a display panel;

an optical lens assembly comprising a spatial division lenticular lens part configured to convert the view image displayed on the display panel into N stereoscopic images in which directions of the view images are different from each other to emit the converted view image therefrom toward a viewing space corresponding to the view image displayed on the display panel, wherein, 'N' is a natural number of no less than two;

a control part converting an image received during a frame interval period into the at least two view images; and a display driving part temporally dividing the frame interval period into at least two sub-frame interval periods to display the at least two view images on the display panel, wherein the display panel is configured to display a first view image thereon during a first sub-frame interval period of the frame interval period, wherein the spatial division lenticular lens part is configured to convert the first view image into N stereoscopic images in which directions thereof are different from each other, wherein the spatial division lenticular lens part is configured to refract the N stereoscopic images, wherein the spatial division lenticular lens part is configured to emit the refracted N-stereoscopic images therefrom toward a first viewing space corresponding to the first view image, wherein the display panel is configured to display a second view image thereon during a second sub-frame interval period of the frame interval period;

wherein the spatial division lenticular lens part is configured to convert the second view image into N stereoscopic images in which directions thereof are different from each other, wherein the spatial division lenticular lens part is configured to emit the N stereoscopic images therefrom toward a second viewing space corresponding to the second view image without refracting the N stereoscopic images, wherein the spatial division lenticular lens part is configured to emit the N stereoscopic images toward the first and second viewing spaces, wherein in one of the first or second sub-frame interval periods the spatial division lenticular lens part is configured to refract the N stereoscopic images and emit the refracted N stereoscopic images therefrom toward one of the first or second viewing spaces and wherein in the other one of the first or second sub-frame interval periods the spatial division lenticular lens part is configured to emit the N stereoscopic images therefrom toward the other one of the first or second viewing spaces without refracting the N stereoscopic images.

5. The stereoscopic image display device of claim 4, wherein the optical lens assembly further comprises:

a partition wall part comprising a plurality of partition walls to divide the display panel into a plurality of sub-areas, the partition walls being arranged to have an interval of N pixels along a first direction and being extended along a second direction crossing the first direction; and a temporal division part comprising at least two shutters respectively corresponding to the first and second view spaces, the temporal division part selectively opening and closing the at least two shutters to emit the N stereoscopic images toward a viewing space corresponding to the view image displayed on the display panel.

6. The stereoscopic image display device of claim 5, further comprising a temporal dividing driving part, wherein the temporal dividing driving part controls the temporal division part, so that a shutter of the at least two shutters, which corresponds to the view image displayed on the display panel, is opened, and a shutter of the at least two shutters, which corresponds to another view image is closed.

7. The stereoscopic image display device of claim 5, wherein the temporal division part is disposed between the partition wall part and the spatial division lenticular part.

8. The stereoscopic image display device of claim 5, wherein the temporal division part is disposed on the spatial division lenticular lens part.

9. The stereoscopic image display device of claim 5, wherein the spatial division lenticular lens part comprises:
   a lenticular plate comprising a plurality of lenticular lenses respectively disposed on the sub-areas, each of the lenticular lenses converting an image displayed on a sub-areas into the N stereoscopic images; and
   a spatial division plate comprising a plurality of spatial division lenses disposed on the lenticular plate, each of the spatial division plate having at least two light-exiting portions emitting the N stereoscopic images received from the lenticular plate toward the first and second viewing spaces.

10. The stereoscopic image display device of claim 9, wherein the spatial division lenses are arranged along the first direction in accordance with the lenticular lenses to be extended along the second direction.

11. The stereoscopic image display device of claim 9, wherein the spatial division plate comprises:
   a first lens part comprising a plurality of first spatial division lenses arranged along the first direction;
   a second lens part adjacent to the first lens part in the second direction and comprising a plurality of second spatial division lenses, the second spatial division lenses being arranged along the first direction; and
   a third lens part adjacent to the second lens part in the second direction and comprising a plurality of third spatial division lenses, the third spatial division lenses being arranged along the first direction,
   wherein an arrangement sequence of a light-exiting portion of the first spatial division lens, an arrangement sequence of a light-exiting portion of the second spatial division lens and an arrangement sequence of a light-exiting portion of the third spatial division lens are different from each other.

12. The stereoscopic image display device of claim 11, wherein the display panel comprises a plurality of color pixels, each of the color pixels is defined by two short sides extended in the first direction and two long sides extended in the second direction, and each of the first, second and third spatial division lenticular lenses is disposed in an area corresponding to N×(N/K) pixels, wherein, K' is the number of the color pixels.

13. The stereoscopic image display device of claim 5, wherein the spatial division lenticular lens part comprises a plurality of spatial division lenticular lenses disposed on the display panel, each of the spatial division lenticular lenses has a curvature of a reference arc, and comprises at least two light-exiting portions emitting the N stereoscopic images toward the first and second viewing spaces.

14. The stereoscopic image display device of claim 13, wherein the spatial division lenticular lenses are arranged along the first direction in accordance with the sub-areas of the display panel, and are extended along the second direction.

15. The stereoscopic image display device of claim 13, wherein the spatial division lenticular lens part comprises:
   a first lens part comprising a plurality of first spatial division lenticular lenses arranged along the first direction;
   a second lens part adjacent to the first lens part in the second direction and comprising a plurality of second spatial division lenticular lenses, the second spatial division lenticular lenses being arranged along the first direction; and
   a third lens part adjacent to the second lens part in the second direction and comprising a plurality of third spatial division lenticular lenses, the third spatial division lenticular lenses being arranged along the first direction,
   wherein an arrangement sequence of a light-exiting portion of the first spatial division lenticular lens, an arrangement sequence of a light-exiting portion of the second spatial division lenticular lens and an arrangement sequence of a light-exiting portion of the third spatial division lenticular lens are different from each other.

16. The stereoscopic image display device of claim 15, wherein the display panel comprises a plurality of color pixels, each of the color pixels is defined by two short sides extended in the first direction and two long sides extended in the second direction, and each of the first, second and third spatial division lenticular lenses is disposed in an area corresponding to N×(N/K) pixels, wherein, K' is the number of the color pixels.

17. The stereoscopic image display device of claim 4, wherein the display panel comprises a plurality of color pixels, and the color pixels are arranged in a mosaic shape.

* * * * *